United States Patent
Shen et al.

(10) Patent No.: US 6,526,481 B1
(45) Date of Patent: Feb. 25, 2003

(54) ADAPTIVE CACHE COHERENCE PROTOCOLS

(75) Inventors: Xiaowei Shen, Cambridge, MA (US); Arvind Mithal, Arlington, MA (US); Lawrence Rogel, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/561,168

(22) Filed: Apr. 27, 2000

Related U.S. Application Data

(63) Continuation-in-part of application No. 09/300,641, filed on Apr. 27, 1999.
(60) Provisional application No. 60/131,229, filed on Apr. 27, 1999, provisional application No. 60/124,127, filed on Mar. 12, 1999, and provisional application No. 60/112,619, filed on Dec. 17, 1998.

(51) Int. Cl.[7] .................................................. C06F 12/00
(52) U.S. Cl. ........................ 711/147; 711/118; 711/122; 711/141; 711/147; 711/148; 711/167; 709/215
(58) Field of Search ................................ 711/147, 141, 711/118, 122, 167, 148; 709/215

(56) References Cited

U.S. PATENT DOCUMENTS

| | | | |
|---|---|---|---|
| 5,749,095 A | 5/1998 | Hagersten | |
| 5,778,423 A | 7/1998 | Sites et al. | |
| 5,829,025 A | 10/1998 | Mittal | |
| 5,860,126 A | 1/1999 | Mittal | |
| 5,873,117 A | 2/1999 | Hagersten et al. | |
| 5,887,138 A | 3/1999 | Hagersten et al. | |
| 5,893,144 A | 4/1999 | Wood et al. | |
| 5,909,697 A | * 6/1999 | Hayes et al. ................. | 711/144 |
| 6,038,642 A | 3/2000 | Arimilli et al. | |

OTHER PUBLICATIONS

Aditya et al., "Semantics pf pH: A parallel dialect of Haskell", Computation Structures Group Memo, 377–1, Jun. 7, 1995.
Adve et al., "Weak Ordering—A New Definition", IEEE, 1990.
Adve et al., "A Unified Formalization of Four Shared–Memory Models", Computer Sciences Technical Report #1051, 1992.
Adve et al., "Shared Memory Consistency Models: A Tutorial", IEEE, Sep. 1995.

(List continued on next page.)

Primary Examiner—Do Hyun Yoo
Assistant Examiner—Mehdi Namazi
(74) Attorney, Agent, or Firm—Fish & Richardson P.C.

(57) ABSTRACT

A methodology for designing a distributed shared-memory system, which can incorporate adaptation or selection of cache protocols during operation, guarantees semantically correct processing of memory instructions by the multiple processors. A set of rules includes a first subset of "mandatory" rules and a second subset of "voluntary" rules such that correct operation of the memory system is provided by application of all of the mandatory rules and selective application of the voluntary rules. A policy for enabling voluntary rules specifies a particular coherent cache protocol. The policy can include various types of adaptation and selection of different operating modes for different addresses and at different caches. A particular coherent cache protocol can make use of a limited capacity directory in which some but not necessarily all caches that hold a particular address are identified in the directory. In another coherent cache protocol, various caches hold an address in different modes which, for example, affect communication between a cache and a shared memory in processing particular memory instructions.

8 Claims, 21 Drawing Sheets

OTHER PUBLICATIONS

Adve et al., "A Retrospective on 'Weak Ordering—A New Definition'", First 25 International Symposia on Computer Architecture, ACM Press, 1998.

Ang et al., "The Start–Voyager Parallel System", International Conference on Parallel Architectures and Compilation Techniques (PACT '98), Oct. 13–17, 1998, Paris, France.

Bennett et al., "Adaptive Software Cache Management for Distributed Shared Memory Architectures", Proceedings of the $17^{th}$ Annual International Symposium on Computer Architecture, May 1990.

Blumofe et al., "An Analysis of Dag–Consistent Distributed Shared–Memory Algorithms", Proceedings of the Eighth Annual ACM Symposium on Parallel Algorithms and Architectures (SPAA), Jun. 24, 26, 1996, Padua, Italy.

Chandra et al., "Teapot: Language Support for Writing Memory Coherence Protocols", SIGPLAN Conference on Programming Language Design and Implementation (PLDI), May 1996.

Cox et al., "Adaptive Cache Coherency for Detecting Migratory Shared Data", ISCA93, May 1993.

Eggers et al., "Evaluating the Performance of Four Snooping Cache Coherency Protocols", Proceedings of the $16^{th}$ Annual International Symposium on Computer Architecture, May 1989.

Falsafi et al., "Application–Specific Protocols for User–Level Shared Memory", Supercomputing, Nov. 1994.

Frigo et al., "Computation–Centric Memory Models", Proceedings of the $10^{th}$ ACM Symposium on Parallel Algorithms and Architectures (SPAA), Jun. 28–Jul. 2, 1998.

Gao et al., "Advanced Compilers, Architectures and Parallel Systems", ACAPS Technical Memo 78, Dec. 31, 1993.

Gao et al., "Location Consistency—a New Memory Model and Cache Consistency Protocol", CAPSL Technical Memo 16, Feb. 16, 1998.

Gharachorloo et al., "Memory Consistency and Event Ordering in Scalable Shared–Memory Multiprocessors", The Proceedings of the $17^{th}$ International Symposium on Computer Architecture, pp. 15–26, May 1990.

Gharachorloo et al., "Two Techniques to Enhance the Performance of Memory Consistency Models", Computer Systems Laboratory, 1991.

Gharachorloo et al., "Programming for Different Memory Consistency Models", Journal of Parallel and Distributed Computing, 1992.

Hill, Mark D., "Multiprocessors Should Support Simple Memory Consistency Models", IEEE Computer, 1998.

Keleher et al., "Lazy Release Consistency for Software Distributed Shared Memory", Department of Computer Science, Mar. 9, 1992.

Lamport, Leslie, "How to Make a Multiprocessor Computer that Correctly Executes Multiprocess Programs", IEEE Transactions on Computers, vol. 28, No. 9, Sep. 1979.

Lenoski et al., "The DASH Prototype: Implementation and Performance", ACM, 1992.

Mukherjee et al., "Using Protection to Accelerate Coherence Protocols", International Symposium on Computer Architecture, 1998.

Ranganathan et al., "An Evaluation of Memory Consistency Models for Shared–Memory Systems with ILP Processors", Proceedings of ASPLOS–VII, Oct. 1996.

Scheurich et al., "Correct Memory Operation of Cache–Based Multiprocessors", ACM, 1987.

Shen et al., "A Methodology for Designing Correct Cache Coherence Protocols for DSM Systems", Computation Structures Group Memo 398 (A) 1997.

Shen et al., "Modeling and Verification of ISA Implementations", Computation Structures Group Memo 400 (A), Jun. 1997.

Stenstrom et al., "An Adaptive Cache Coherence Protocol Optimized for Migratory Sharing", Proceedings of the $20^{th}$ Annual International Symposium on Computer Architecture, May 1993.

Weber et al., "Analysis of Cache Invalidation Patterns in Multiprocessors", Proceedings of the $3^{rd}$ International Conference on Architectural Support for Programming Languages and Operating Systems, 1989.

* cited by examiner

| Instruction | Cstate | Action | Next Cstate | |
|---|---|---|---|---|
| Loadl($a$) | Cell($a,v$,Clean) | retire | Cell($a,v$,Clean) | P1 |
| | Cell($a,v$,Dirty) | retire | Cell($a,v$,Dirty) | P2 |
| | Cell($a,v$,WbPending) | stall | Cell($a,v$,WbPending) | P3 |
| | Cell($a,-$,CachePending) | stall | Cell($a,-$,CachePending) | P4 |
| | $a \notin cache$ | stall, (CacheReq, $a$) → H | Cell($a,-$,CachePending) | P5 |
| Storel($a,v$) | Cell($a,-$,Clean) | retire | Cell($a,v$,Dirty) | P6 |
| | Cell($a,-$,Dirty) | retire | Cell($a,v$,Dirty) | P7 |
| | Cell($a,v_1$,WbPending) | stall | Cell($a,v_1$,WbPending) | P8 |
| | Cell($a,-$,CachePending) | stall | Cell($a,-$,CachePending) | P9 |
| | $a \notin cache$ | stall, (CacheReq, $a$) → H | Cell($a,-$,CachePending) | P10 |
| Commit($a$) | Cell($a,v$,Clean) | retire | Cell($a,v$,Clean) | P11 |
| | Cell($a,v$,Dirty) | stall, (Wb, $a,v$) → H | Cell($a,v$,WbPending) | P12 |
| | Cell($a,v_1$,WbPending) | stall | Cell($a,v_1$,WbPending) | P13 |
| | Cell($a,-$,CachePending) | stall | Cell($a,-$,CachePending) | P14 |
| | $a \notin cache$ | retire | $a \notin cache$ | P15 |
| Reconcile($a$) | Cell($a,-$,Clean) | stall | $a \notin cache$ | P16 |
| | Cell($a,v$,Dirty) | retire | Cell($a,v$,Dirty) | P17 |
| | Cell($a,v$,WbPending) | stall | Cell($a,v$,WbPending) | P18 |
| | Cell($a,-$,CachePending) | stall | Cell($a,-$,CachePending) | P19 |
| | $a \notin cache$ | retire | $a \notin cache$ | P20 |

FIG. 4A

Voluntary C-engine Rules

| Cstate | Action | Next Cstate | |
|---|---|---|---|
| Cell(a,-,Clean) | | a∉cache | VC1 |
| Cell(a,v,Dirty) | (Wb,a,v)→H | Cell(a,v,WbPending) | VC2 |
| a∉cache | (CacheReq,a)→H | Cell(a,-,CachePending) | VC3 |

FIG. 4B

Mandatory C-engine Rules

| Msg from H | Cstate | Action | Next Cstate | |
|---|---|---|---|---|
| (Cache,a,v) | Cell(a,-,CachePending) | | Cell(a,v,Clean) | MC1 |
| (WbAck,a) | Cell(a,v,WbPending) | | Cell(a,v,Clean) | MC2 |

FIG. 4C

Mandatory M-engine Rules

| Msg from id | Mstate | Action | Next Mstate | |
|---|---|---|---|---|
| (CacheReq,a) | Cell(a,v) | (Cache,a,v)→id | Cell(a,v) | MM1 |
| (Wb,a,v) | Cell(a,-) | (WbAck,a)→id | Cell(a,v) | MM2 |

Mandatory Processor Rules

| Instruction | Cstate | Action | Next Cstate | |
|---|---|---|---|---|
| Load$l(a)$ | Cell$(a,v,$Clean$)$ | retire | Cell$(a,v,$Clean$)$ | P1 |
| | Cell$(a,v,$Dirty$)$ | retire | Cell$(a,v,$Dirty$)$ | P2 |
| | Cell$(a,v,$WbPending$)$ | stall | Cell$(a,v,$WbPending$)$ | P3 |
| | Cell$(a,-,$CachePending$)$ | stall | Cell$(a,-,$CachePending$)$ | P4 |
| | $a \notin cache$ | stall (CacheReq, $a$) → H | Cell$(a,-,$CachePending$)$ | P5 |
| Store$l(a,v)$ | Cell$(a,-,$Clean$)$ | retire | Cell$(a,v,$Dirty$)$ | P6 |
| | Cell$(a,-,$Dirty$)$ | retire | Cell$(a,v,$Dirty$)$ | P7 |
| | Cell$(a,v_1,$WbPending$)$ | stall | Cell$(a,v,$WbPending$)$ | P8 |
| | Cell$(a,-,$CachePending$)$ | stall | Cell$(a,-,$CachePending$)$ | P9 |
| | $a \notin cache$ | stall (CacheReq, $a$) → H | Cell$(a,-,$CachePending$)$ | P10 |
| Commit$(a)$ | Cell$(a,v,$Clean$)$ | retire | Cell$(a,v,$Clean$)$ | P11 |
| | Cell$(a,v,$Dirty$)$ | stall (Wb, $a,v$) → H | Cell$(a,v,$WbPending$)$ | P12 |
| | Cell$(a,v,$WbPending$)$ | stall | Cell$(a,v,$WbPending$)$ | P13 |
| | Cell$(a,-,$CachePending$)$ | stall | Cell$(a,-,$CachePending$)$ | P14 |
| | $a \notin cache$ | retire | $a \notin cache$ | P15 |
| Reconcile$(a)$ | Cell$(a,v,$Clean$)$ | retire | Cell$(a,v,$Clean$)$ | P16 |
| | Cell$(a,v,$Dirty$)$ | retire | Cell$(a,v,$Dirty$)$ | P17 |
| | Cell$(a,v,$WbPending$)$ | stall | Cell$(a,v,$WbPending$)$ | P18 |
| | Cell$(a,-,$CachePending$)$ | stall | Cell$(a,-,$CachePending$)$ | P19 |
| | $a \notin cache$ | retire | $a \notin cache$ | P20 |

Voluntary C-engine Rules

| Cstate | Action | Next Cstate | |
|---|---|---|---|
| Cell(a,-,Clean) | (Purge,a)→H | a∉cache | VC1 |
| Cell(a,v,Dirty) | (Wb,a,v)→H | Cell(a,v,WbPending) | VC2 |
| a∉cache | (CacheReq,a)→H | Cell(a,-,CachePending) | VC3 |

FIG. 6B

Mandatory C-engine Rules

| Msg from H | Cstate | Action | Next Cstate | |
|---|---|---|---|---|
| (Cache,a,v) | a∉cache | | Cell(a,v,Clean) | MC1 |
| | Cell(a,-,CachePending) | | Cell(a,v,Clean) | MC2 |
| (WbAck,a) | Cell(a,v,WbPending) | | Cell(a,v,Clean) | MC3 |
| (FlushAck,a) | Cell(a,-,WbPending) | | a∉cache | MC4 |
| (PurgeReq,a) | Cell(a,-,Clean) | | a∉cache | MC5 |
| | Cell(a,v,Dirty) | (Purge,a)→H | Cell(a,v,WbPending) | MC6 |
| | Cell(a,v,WbPending) | (Wb,a,v)→H | Cell(a,v,WbPending) | MC7 |
| | Cell(a,-,CachePending) | | Cell(a,-,CachePending) | MC8 |
| | a∉cache | | a∉cache | MC9 |

FIG. 6C

Voluntary M-engine Rules

| Mstate | Action | Next Mstate | |
|---|---|---|---|
| Cell($a,v,C[dir]$) ($id \notin dir$) | (Cache,$a,v$)→$id$ | Cell($a,v,C[id|dir]$) | VM1 |
| Cell($a,v,C[dir]$) ($dir \neq \epsilon$) | (PurgeReq,$a$)→$dir$ | Cell($a,v,T[dir, \epsilon]$) | VM2 |

FIG. 6D

Mandatory M-engine Rules

| Msg from $id$ | Mstate | Action | Next Mstate | |
|---|---|---|---|---|
| (CacheReq, $a$) | Cell($a,v,C[dir]$) ($id \notin dir$) | (Cache,$a,v$)→$id$ | Cell($a,v,C[id|dir]$) | MM1 |
| | Cell($a,v,C[dir]$) ($id \in dir$) | | Cell($a,v,C[dir]$) | MM2 |
| | Cell($a,v,T[dir,sm]$) ($id \notin dir$) | stall message | Cell($a,v,T[dir,sm]$) | MM3 |
| | Cell($a,v,C[dir,sm]$) ($id \in dir$) | | Cell($a,v,T[dir,sm]$) | MM4 |
| (Wb,$a,v$) | Cell($a,v',C[id|dir]$) | | Cell($a,v,T[dir,(id,v)]$) | MM5 |
| | Cell($a,v',T[id|dir,sm]$) | (PurgeReq,$a$)→$dir$ | Cell($a,v',T[dir,(id,v),sm]$) | MM6 |
| (Purge,$a$) | Cell($a,v,C[id|dir]$) | | Cell($a,v,C[dir]$) | MM7 |
| | Cell($a,v,T[id|dir,sm]$) | | Cell($a,v,T[dir,sm]$) | MM8 |
| | Cell($a,-,T[\epsilon,(id,v)|sm]$) | (FlushAck,$a$)→$id$ | Cell($a,v,T[\epsilon,sm]$) | MM9 |
| | Cell($a,-,T[\epsilon,(id,v)]$) | (WbAck,$a$)→$id$ | Cell($a,v,C[id]$) | MM10 |
| | Cell($a,v,T[\epsilon,\epsilon]$) | | Cell($a,v,C[\epsilon]$) | MM11 |

FIG. 6E

| | Mandatory Processor Rules | | | |
|---|---|---|---|---|
| Instruction | Cstate | Action | Next Cstate | |
| Loadl(a) | Cell(a,v,Clean) | retire | Cell(a,v,Clean) | P1 |
| | Cell(a,v,Dirty) | retire | Cell(a,v,Dirty) | P2 |
| | Cell(a,-,CachePending) | stall | Cell(a,-,CachePending) | P3 |
| | a∉cache | stall, ⟨CacheReq, a⟩→H | Cell(a,-,CachePending) | P4 |
| Storel(a,v) | Cell(a,-,Clean) | retire | Cell(a,v,Dirty) | P5 |
| | Cell(a,-,Dirty) | retire | Cell(a,v,Dirty) | P6 |
| | Cell(a,-,CachePending) | stall | Cell(a,-,CachePending) | P7 |
| | a∉cache | stall, ⟨CacheReq, a⟩→H | Cell(a,-,CachePending) | P8 |
| Commit(a) | Cell(a,v,Clean) | retire | Cell(a,v,Clean) | P9 |
| | Cell(a,v,Dirty) | retire | Cell(a,v,Dirty) | P10 |
| | Cell(a,-,CachePending) | stall | Cell(a,-,CachePending) | P11 |
| | a∉cache | retire | a∉cache | P12 |
| Reconcile(a) | Cell(a,v,Clean) | retire | Cell(a,v,Clean) | P13 |
| | Cell(a,v,Dirty) | retire | Cell(a,v,Dirty) | P14 |
| | Cell(a,-,CachePending) | stall | Cell(a,-,CachePending) | P15 |
| | a∉cache | retire | a∉cache | P16 |

820 — Voluntary C-engine Rules

| Cstate | Action | Next Cstate | |
|---|---|---|---|
| Cell($a,\_,$Clean) | (Purge,$a$)→H | $a \notin cache$ | VC1 |
| Cell($a,v,$Dirty) | (Flush,$a$)→H | $a \notin cache$ | VC2 |
| $a \notin cache$ | (CacheReq,$a$)→H | Cell($a,\_,$CachePending) | VC3 |

FIG. 8B

830 — Mandatory C-engine Rules

| Msg from H | Cstate | Action | Next Cstate | |
|---|---|---|---|---|
| (Cache,$a,v$) | $a \notin cache$ | | Cell($a,v,$Clean) | MC1 |
| | Cell($a,\_,$CachePending) | | Cell($a,v,$Clean) | MC2 |
| (FlushReq,$a$) | Cell($a,\_,$Clean) | (Purge,$a$)→H | $a \notin cache$ | MC3 |
| | Cell($a,v,$Dirty) | (Flush,$a,v$)→H | $a \notin cache$ | MC4 |
| | Cell($a,\_,$CachePending) | | Cell($a,\_,$CachePending) | MC5 |
| | $a \notin cache$ | | $a \notin cache$ | MC6 |

FIG. 8C

Voluntary M-engine Rules (840)

| Mstate | Action | Next Mstate | |
|---|---|---|---|
| Cell($a,v,C[\ni]$) | (Cache,$a,v$)→$id$ | Cell($a,v,C[id]$) | VM1 |
| Cell($a,v,C[id]$) | (FlushReq,$a$)→$id$ | Cell($a,v,T[id]$) | VM2 |

FIG. 8D

Mandatory M-engine Rules (650)

| Msg from $id$ | Mstate | Action | Next Mstate | |
|---|---|---|---|---|
| (CacheReq,$a$) | Cell($a,v,C[\ni]$) | (Cache,$a,v$)→$id$ | Cell($a,v,C[id]$) | MM1 |
| | Cell($a,v,C[id_1]$) ($id_1 \neq id$) | stall message (FlushReq,$a$)→$id_1$ | Cell($a,v,T[id_1]$) | MM2 |
| | Cell($a,-,T[id_1]$) ($id_1 \neq id$) | stall message | | MM3 |
| | Cell($a,v,C[id]$) | | Cell($a,-,T[id_1]$) | MM4 |
| | Cell($a,-,T[id]$) | | Cell($a,-,T[id]$) | MM5 |
| (Purge,$a$) | Cell($a,v,C[id]$) | | Cell($a,v,C[\ni]$) | MM6 |
| | Cell($a,v,T[id]$) | | Cell($a,v,C[\ni]$) | MM7 |
| (Flush,$a$) | Cell($a,-,C[id]$) | | Cell($a,v,C[\ni]$) | MM8 |
| | Cell($a,-,T[id]$) | | Cell($a,-,C[\ni]$) | MM9 |

| Mandatory Processor Rules ||||
|---|---|---|---|
| Instruction | Cstate | Action | Next Cstate | |
| Loadl($a$) | Cell($a,v$,Clean$_b$) | retire | Cell($a,v$,Clean$_b$) | P1 |
| | Cell($a,v$,Dirty$_b$) | retire | Cell($a,v$,Dirty$_b$) | P2 |
| | Cell($a,v$,Clean$_w$) | retire | Cell($a,v$,Clean$_w$) | P3 |
| | Cell($a,v$,Dirty$_w$) | retire | Cell($a,v$,Dirty$_w$) | P4 |
| | Cell($a,v$,Clean$_m$) | retire | Cell($a,v$,Clean$_m$) | P5 |
| | Cell($a,v$,Dirty$_m$) | retire | Cell($a,v$,Dirty$_m$) | P6 |
| | Cell($a,v$,WbPending) | stall | Cell($a,v$,WbPending) | P7 |
| | Cell($a,-$,CachePending) | stall | Cell($a,-$,CachePending) | P8 |
| | $a \notin$ cache | stall, (CacheReq, $a$)$\to$ H | Cell($a,-$,CachePending) | P9 |
| Storel($a,v$) | Cell($a,-$,Clean$_b$) | retire | Cell($a,-$,Clean$_b$) | P10 |
| | Cell($a,-$,Dirty$_b$) | retire | Cell($a,v$,Dirty$_b$) | P11 |
| | Cell($a,-$,Clean$_w$) | retire | Cell($a,v$,Clean$_w$) | P12 |
| | Cell($a,-$,Dirty$_w$) | retire | Cell($a,v$,Dirty$_w$) | P13 |
| | Cell($a,-$,Clean$_m$) | retire | Cell($a,v$,Clean$_m$) | P14 |
| | Cell($a,-$,Dirty$_m$) | retire | Cell($a,v$,Dirty$_m$) | P15 |
| | Cell($a,v_1$,WbPending) | stall | Cell($a,v_1$,WbPending) | P16 |
| | Cell($a,-$,CachePending) | stall | Cell($a,-$,CachePending) | P17 |
| | $a \notin$ cache | stall, (CacheReq, $a$)$\to$ H | Cell($a,-$,CachePending) | P18 |
| Commit($a$) | Cell($a,v$,Clean$_b$) | retire | Cell($a,v$,Clean$_b$) | P19 |
| | Cell($a,v$,Dirty$_b$) | stall, (Wb$_b$, $a,v$)$\to$ H | Cell($a,v$,WbPending) | P20 |
| | Cell($a,v$,Clean$_w$) | retire | Cell($a,v$,Clean$_w$) | P21 |
| | Cell($a,v$,Dirty$_w$) | stall, (Down$_{wb}$, $a,v$)$\to$ H (Wb$_b$, $a,v$)$\to$ H | Cell($a,v$,WbPending) | P22 |
| | Cell($a,v$,Clean$_m$) | retire | Cell($a,v$,Clean$_m$) | P23 |
| | Cell($a,v$,Dirty$_m$) | retire | Cell($a,v$,Dirty$_m$) | P24 |
| | Cell($a,v$,WbPending) | stall | Cell($a,v$,WbPending) | P25 |
| | Cell($a,-$,CachePending) | stall | Cell($a,-$,CachePending) | P26 |
| | $a \notin$ cache | retire | $a \notin$ cache | P27 |
| Reconcile($a$) | Cell($a,-$,Clean$_b$) | retire | $a \notin$ cache | P28 |
| | Cell($a,-$,Dirty$_b$) | retire | Cell($a,v$,Dirty$_b$) | P29 |
| | Cell($a,-$,Clean$_w$) | retire | Cell($a,v$,Clean$_w$) | P30 |
| | Cell($a,-$,Dirty$_w$) | retire | Cell($a,v$,Dirty$_w$) | P31 |
| | Cell($a,-$,Clean$_m$) | retire | Cell($a,v$,Clean$_m$) | P32 |
| | Cell($a,-$,Dirty$_m$) | retire | Cell($a,v$,Dirty$_m$) | P33 |
| | Cell($a,v_1$,WbPending) | stall | Cell($a,v_1$,WbPending) | P34 |
| | Cell($a,-$,CachePending) | stall | Cell($a,-$,CachePending) | P35 |
| | $a \notin$ cache | retire | $a \notin$ cache | P36 |

FIG. 12A

Voluntary C-engine Rules

| Cstate | Action | Next Cstate | |
|---|---|---|---|
| Cell($a,-$,Clean$_b$) | | $a \notin cache$ | VC1 |
| Cell($a,v$,Dirty$_b$) | (Wb$_b$, $a,v$)→H | Cell($a,v$,WbPending) | VC2 |
| Cell($a,v$,Clean$_w$) | (Down$_{wb}$, $a$)→H | Cell($a,-$,Clean$_b$) | VC3 |
| Cell($a,v$,Dirty$_w$) | (Down$_{wb}$, $a$)→H | Cell($a,v$,Dirty$_b$) | VC4 |
| Cell($a,v$,Clean$_m$) | (Down$_{mw}$, $a,v$)→H | Cell($a,v$,Clean$_w$) | VC5 |
| Cell($a,v$,Dirty$_m$) | (DownV$_{mw}$, $a,v$)→H | Cell($a,v$,Dirty$_w$) | VC6 |
| $a \notin cache$ | (CacheReq, $a$)→H | Cell($a,-$,CachePending) | VC7 |

FIG. 12B

| Mandatory C-engine Rules ||||  |
|---|---|---|---|---|
| Msg from H | Cstate | Action | Next Cstate | |
| $(Cache_b, a, v)$ | $Cell(a,-,CachePending)$ | | $Cell(a,v,Clean_b)$ | MC1 |
| $(Cache_w, a, v)$ | $Cell(a,-,Clean_b)$ | | $Cell(a,v,Clean_w)$ | MC2 |
| | $Cell(a,v_1,Dirty_b)$ | | $Cell(a,v_1,Dirty_w)$ | MC3 |
| | $Cell(a,v_1,WbPending)$ | | $Cell(a,v_1,WbPending)$ | MC4 |
| | $Cell(a,-,CachePending)$ | | $Cell(a,v,Clean_w)$ | MC5 |
| | | | $Cell(a,v,Clean_w)$ | MC6 |
| $(Up_{wm}, a)$ | $Cell(a,v,Clean_b)$ | | $Cell(a,v,Clean_b)$ | MC7 |
| | $Cell(a,v_1,Dirty_b)$ | | $Cell(a,v_1,Dirty_b)$ | MC8 |
| | $Cell(a,v,Clean_w)$ | | $Cell(a,v,Clean_m)$ | MC9 |
| | $Cell(a,v_1,Dirty_w)$ | | $Cell(a,v_1,Dirty_m)$ | MC10 |
| | $Cell(a,v,WbPending)$ | | $Cell(a,v,WbPending)$ | MC11 |
| | $Cell(a,-,CachePending)$ | | $Cell(a,-,CachePending)$ | MC12 |
| | $a \notin cache$ | | $a \notin cache$ | MC13 |
| $(WbAck_b, a)$ | $Cell(a,v,WbPending)$ | | $Cell(a,v,Clean_b)$ | MC14 |
| $(WbAck_w, a)$ | $Cell(a,v,WbPending)$ | | $Cell(a,v,Clean_w)$ | MC15 |
| $(DownReq_{wb}, a)$ | $Cell(a,v,Clean_b)$ | | $Cell(a,v,Clean_b)$ | MC16 |
| | $Cell(a,v_1,Dirty_b)$ | | $Cell(a,v_1,Dirty_b)$ | MC17 |
| | $Cell(a,v,Clean_w)$ | $(Down_{wb}, a) \to H$ | $Cell(a,v,Clean_b)$ | MC18 |
| | $Cell(a,v_1,Dirty_w)$ | $(Down_{wb}, a) \to H$ | $Cell(a,v_1,Dirty_b)$ | MC19 |
| | $Cell(a,v,WbPending)$ | | $Cell(a,v,WbPending)$ | MC20 |
| | $Cell(a,-,CachePending)$ | | $Cell(a,-,CachePending)$ | MC21 |
| | $a \notin cache$ | | $a \notin cache$ | MC22 |
| $(DownReq_{mw}, a)$ | $Cell(a,v,Clean_b)$ | | $Cell(a,v,Clean_b)$ | MC23 |
| | $Cell(a,v_1,Dirty_b)$ | | $Cell(a,v_1,Dirty_b)$ | MC24 |
| | $Cell(a,v,Clean_w)$ | | $Cell(a,v,Clean_w)$ | MC25 |
| | $Cell(a,v_1,Dirty_w)$ | | $Cell(a,v_1,Dirty_w)$ | MC26 |
| | $Cell(a,v,Clean_m)$ | $(Down_{mw}, a) \to H$ | $Cell(a,v,Clean_w)$ | MC27 |
| | $Cell(a,v_1,Dirty_m)$ | $(DownV_{mw}, a) \to H$ | $Cell(a,v_1,Clean_w)$ | MC28 |
| | $Cell(a,v,WbPending)$ | | $Cell(a,v,WbPending)$ | MC29 |
| | $Cell(a,-,CachePending)$ | | $Cell(a,-,CachePending)$ | MC30 |
| | $a \notin cache$ | | $a \notin cache$ | MC31 |

FIG. 12C

Voluntary M-engine Rules

| Mstate | Action | Next Mstate | |
|---|---|---|---|
| Cell($a,v,C_w[dir]$) ($id = \notin dir$) | (Cache$_w,a,v$)→$id$ | Cell($a,v,C[id][dir]$) | VM1 |
| Cell($a,v,C_w[id]$) | (Up$_{wm},a$)→$id$ | Cell($a,v,C_m[id]$) | VM2 |
| Cell($a,v,C_w[dir]$) | (DownReq$_{wb},a$)→$id$ | Cell($a,v,T_w[dir,\in]$) | VM3 |
| Cell($a,v,C_m[id]$) | (DownReq$_{mw},a$)→$id$ | Cell($a,v,T_m[id]$) | VM4 |
| Cell($a,v,T_m[id]$) | (DownReq$_{wb},a$)→$id$ | Cell($a,v,T_m[id,\in]$) | VM5 |

FIG. 12D

| Mandatory M-engine Rules ||||| 
|---|---|---|---|---|
| Msg from $id$ | Mstate | Action | Next Mstate | |
| (CacheReq, $a$) | Cell($a,v,C_w[dir]$) ($id \notin dir$) | (Cache$_b,a,v$)→ $id$ | Cell($a,v,C_w[dir]$) | MM1 |
| | Cell($a,v,T_w[dir,sm]$) ($id \notin dir$) | stall message | Cell($a,v,T_w[dir,sm]$) | MM2 |
| | Cell($a,v,C_w[dir]$) ($id \in dir$) | | Cell($a,v,C_w[dir]$) | MM3 |
| | Cell($a,v,T_w[dir,sm]$) ($id \in dir$) | | Cell($a,v,T_w[dir,sm]$) | MM4 |
| | Cell($a,v,C_m[id_1]$) ($id_1 \neq id$) | stall message (DownReq$_{mw},a$)→ $id_1$ | Cell($a,v,T'_m[id_1]$) | MM5 |
| | Cell($a,v,T'_m[id_1]$) ($id_1 \neq id$) | stall message | Cell($a,v,T'_m[id_1]$) | MM6 |
| | Cell($a,v,T_m[id_1,sm]$) ($id_1 \neq id$) | stall message | Cell($a,v,T_m[id_1,sm]$) | MM7 |
| | Cell($a,v,C_m[id]$) | | Cell($a,v,C_m[id]$) | MM8 |
| | Cell($a,v,T'_m[id]$) | | Cell($a,v,T'_m[id]$) | MM9 |
| | Cell($a,v,T_m[id,sm]$) | | Cell($a,v,T_m[id,sm]$) | MM10 |
| (Wb$_b,a,v$) | Cell($a,v_1,C_w[dir]$) ($id \notin dir$) | (DownReq$_{wb},a$)→ $dir$ | Cell($a,v_1,T_w[dir,(id,v)]$) | MM11 |
| | Cell($a,v_1,T_w[dir,sm]$) ($id \notin dir$) | | Cell($a,v_1,T_w[dir,(id,v),sm]$) | MM12 |
| | Cell($a,v_1,C_w[dir]$) ($id \in dir$) | (DownReq$_{wb},a$)→ $dir$ | Cell($a,v_1,T_w[dir,(id,v)]$) | MM13 |
| | Cell($a,v_1,T_w[dir,sm]$) ($id \in dir$) | | Cell($a,v_1,T_w[dir,(id,v),sm]$) | MM14 |
| | Cell($a,v_1,C_m[id_1]$) ($id_1 \neq id$) | (DownReq$_{mw},a$)→ $id_1$ (DownReq$_{wb},a$)→ $id_1$ | Cell($a,v_1,T_m[id_1,(id,v)]$) | MM15 |
| | Cell($a,v_1,T'_m[id_1]$) ($id_1 \neq id$) | (DownReq$_{wb},a$)→ $id_1$ | Cell($a,v_1,T_m[id_1,(id,v)]$) | MM16 |
| | Cell($a,v_1,T_m[id_1,sm]$) ($id_1 \neq id$) | | Cell($a,v_1,T_m[id_1,(id,v),sm]$) | MM17 |
| | Cell($a,v_1,C_m[id]$) | | Cell($a,v_1,T_w[\epsilon,(id,v)]$) | MM18 |
| | Cell($a,v_1,T'_m[id]$) | | Cell($a,v_1,T_w[\epsilon,(id,v)]$) | MM19 |
| | Cell($a,v_1,T_m[id,sm]$) | | Cell($a,v_1,T_w[\epsilon,(id,v),sm]$) | MM20 |
| (Down$_{wb},a$) | Cell($a,v,C_w[id|dir]$) | | Cell($a,v,C_w[dir]$) | MM21 |
| | Cell($a,v,T_w[id|dir,sm]$) | | Cell($a,v,T_w[dir,sm]$) | MM22 |
| | Cell($a,v,C_m[id]$) | | Cell($a,v,C_w[\epsilon]$) | MM23 |
| | Cell($a,v,T'_m[id]$) | | Cell($a,v,C_w[\epsilon]$) | MM24 |
| | Cell($a,v,T_m[id,sm]$) | | Cell($a,v,T_w[\epsilon,sm]$) | MM25 |
| (Down$_{mw},a$) | Cell($a,v,C_m[id]$) | | Cell($a,v,C_w[id]$) | MM26 |
| | Cell($a,v,T'_m[id]$) | | Cell($a,v,C_w[id]$) | MM27 |
| | Cell($a,v,T_m[id,sm]$) | | Cell($a,v,T_w[id,sm]$) | MM28 |
| (DownV$_{mw},a,v$) | Cell($a,v,C_m[id]$) | | Cell($a,v,C_w[id]$) | MM29 |
| | Cell($a,v,T'_m[id]$) | | Cell($a,v,C_w[id]$) | MM30 |
| | Cell($a,v,T_m[id,sm]$) | | Cell($a,v,T_w[id,sm]$) | MM31 |
| | Cell($a,v_1,T_w[\epsilon,(id,v)|sm]$) | (WbAck,$a$)→ $id$ | Cell($a,v_1,T_w[\epsilon,sm]$) | MM32 |
| | Cell($a,v_1,T_w[\epsilon,(id,v)]$) | (WbAck,$a$)→ $id$ | Cell($a,v_1,C_w[id]$) | MM33 |
| | Cell($a,v_1,T_w[\epsilon,\epsilon]$) | | Cell($a,v_1,C_w[\epsilon]$) | MM34 |

FIG. 12E

ADAPTIVE CACHE COHERENCE PROTOCOLS

CROSS-REFERENCE TO RELATED APPLICATIONS

This application is a continuation-in-part of U.S. application Ser. No. 09/300,641 filed on Apr. 27, 1999, which claimed the benefit of U.S. Provisional Application No. 60/112,619 filed on Dec. 17, 1998 and the benefit of U.S. Provisional Application No. 60/124,127 filed on Mar. 12, 1999. This application also claims the benefit of U.S. Provisional Application No. 60/131,229 filed on Apr. 27, 1999, which is incorporated herein by reference in its entirety.

STATEMENT AS TO FEDERALLY SPONSORED RESEARCH

This invention was made with government support under Office of Naval Research contract N00014-92-J-130 and Ft. Huachuca contract DABT63-95-C-150 awarded by the Advanced Research Projects Agency of the Department of Defense. The government has certain rights in the invention.

BACKGROUND

This invention relates to cache coherence in a distributed shared-memory system.

Many current computer systems make use of hierarchical memory systems to improve memory access from one or more processors. In a common type of multiprocessor system, the processors are coupled to a distributed shared-memory (DSM) system made up of a shared-memory system and a number of memory caches, each coupled between one of the processors and the shared-memory system. The processors execute instructions, including memory access instructions, such as "Load" and "Store," such that from the point of view of each processor a single shared address space is directly accessible to each processor, and changes made to the value stored at a particular address by one processor are "visible" to the other processor. Various techniques, generally referred to as cache coherence protocols, are used to maintain this type of shared behavior. For instance, if one processor updates a value for a particular address in its cache, caches associated with other processors that also have copies of that address are notified by the shared-memory system and the notified caches remove or invalidate that address in their storage, thereby preventing the other processors, which are associated with the notified caches, from using out-of-date values. The shared-memory system keeps a directory that identifies which caches have copies of each address and uses this directory to notify the appropriate caches of an update. In another approach, the caches share a common communication channel (e.g., a memory bus) over which they communicate with the shared-memory system. When one cache updates the shared-memory system, the other caches "snoop" on the common channel to determine whether they should invalidate or update any of their cached values.

In order to guarantee a desired ordering of updates to the shared-memory system and thereby permit synchronization of programs executing on different processors, many processors use instructions, generally known as "fence" instructions, to delay execution of certain memory access instructions until other previous memory access instructions have completed. The PowerPC "Sync" instruction and the Sun SPARC "Membar" instruction are examples of fence instructions in current processors. These fences are very "course grain" in that they require all previous memory access instructions (or a class of all loads or all stores) to complete before a subsequent memory instruction is issued.

Many processor instruction sets also include a "Prefetch" instruction that is used to reduce the latency of Load instructions that would have required a memory transfer between the shared-memory system and a cache. The Prefetch instruction initiates a transfer of data from the shared-memory system to the processor's cache but the transfer does not have to complete before the instruction itself completes. A subsequent Load instruction then accesses the prefetched data, unless the data has been invalidated in the interim by another processor or the data has not yet been provided to the cache.

Two types of cache coherence protocols have been used in prior systems: snoopy protocols for bus-based multiprocessor systems and directory-based protocols for DSM systems. In bus-based multiprocessor systems, since all the processors can observe an ongoing bus transaction, appropriate coherence actions can be taken when an operation threatening coherence is detected. Protocols that fall into this category are called snoopy protocols because each cache snoops bus transactions to watch memory transactions of other processors. Various snoopy protocols have been proposed. For instance in one protocol, when a processor reads an address not in its cache, it broadcasts a read request on the snoopy bus. Memory or the cache that has the most up-to-date copy will then supply the data. When a processor broadcasts its intention to write an address that it does not own exclusively, other caches invalidate their copies.

Unlike snoopy protocols, directory-based protocols do not rely upon the broadcast mechanism to invalidate or update stale copies. They maintain a directory entry for each memory block to record the cache sites in which the memory block is currently cached. The directory entry is often maintained at the site in which the corresponding physical memory resides. Since the locations of shared copies are known, a protocol engine at each site can maintain coherence by employing point-to-point protocol messages. The elimination of broadcast overcomes a major limitation on scaling cache coherent machines to large-scale multiprocessor systems.

A directory-based cache coherence protocol can be implemented with various directory structures. The full-map directory structure maintains a complete record of which caches are sharing the memory block. In a straightforward implementation, each directory entry contains one bit per cache site representing if that cache has a shared copy. Its main drawback is that the directory space can be intolerable for large-scale systems. Alternative directory structures have been proposed to overcome this problem. Different directory structures represent different implementation tradeoffs between performance and implementation complexity and cost.

Shared-memory programs have various access patterns. Empirical evidence suggests that no fixed cache coherence protocol works well for all access patterns. In shared-memory systems, memory references can suffer long latencies for cache misses. To ameliorate this latency, a cache coherence protocol can be augmented with optimizations for different access patterns. Generally speaking, memory accesses can be classified into a number of common sharing patterns, such as the read-modify-write pattern, the producer-consumer pattern and the migratory pattern. An adaptive system can change its actions to address changing program behaviors.

Some cache memory systems employ different memory modes for different address ranges. For example, at a cache one range of addresses may be local addresses while other addresses are global addresses. When a processor updates a value at a local address, the change in not reflected in a shared memory or in the caches of other processors. In this way, access to local addresses can be performed more rapidly than accesses to global addresses. However, the semantics of memory instructions executed by a processor depend on which address range is being accessed.

In other cache memory systems, the cache can support multiple types or modes of write operations. For instance, depending on a variant of a store instruction that is executed or the mode of an address or address range to which the store is directed, the store instruction may complete without necessarily maintaining a coherent memory model, at least for some period of time after the store instruction completes while coherency-related actions are performed. Various other approaches that enhance memory speed at the expense of maintaining a coherent memory model have also been proposed.

SUMMARY

As cache protocols become more complex, for example as a result of incorporating performance enhancing heuristics, correct operation of the overall memory system is difficult to guarantee. In a general aspect, this invention provides a methodology for designing a memory system that incorporates adaptation or selection of cache protocols during operation while guaranteeing semantically correct processing of memory instructions by the multiple processors. Furthermore, the adaptation can be controlled in a decentralized manner, possibly using heuristics local to a particular cache, subject only to specific status messages being passed between caches and a shared memory. As multi-processor systems scale in the number of processors, some prior cache coherence approaches are difficult to implement and to verify their correct operation. For instance, in a directory-based cache coherence approach in which each cache that has a copy of an address is indicated in the directory, the directory must be structured to accommodate all the information. In another general aspect, the invention provides a mechanism by which a directory-based approach can be used for some addresses while using an approach that does not require directory resources for other addresses of for some caches that access the addresses represented in the directory.

In one aspect, in general, the invention is a method for designing a coherent shared-memory system. The method includes accepting an input specification for the shared-memory system that includes a specification of a set of state transition rules for the shared-memory system. Each of the state transition rules includes a precondition and an action. The set of state transition rules includes a first subset of rules and a second subset of rules such that correct operation of the memory system is provided by application of all of the rules in the first subset of rules and any selective application of rules in the second subset of rules. The method also includes accepting a specification of a policy. The policy includes preconditions for application of rules in the second subset of state transition rules. The specification of the policy and the input specification of the state transitions rules are combined to form an output specification of a set of state transition rules. Combining these specifications includes combining preconditions associated with rules in the second subset of rules and the policy to determine preconditions for application of actions associated with the second subset of rules.

The method can include one or more of the following features:

The method can include a step of verifying that correct operation of the memory system is provided by application of all of the rules in the first subset of rules and any selective application of rules in the second subset of rules. Verifying that correct operation is provided can include proving a logical property related to the correct operation of the memory system, such as proving that state sequences for the memory system correspond to state sequences of a reference state machine.

The method can also include implementing the shared-memory system according to the output specification of the state transition rules, for instance, including determining a specification of circuitry whose operation is consistent with the output specification of the state transition rules.

In another aspect, in general, the invention is a method for providing a coherent memory model to a number of processors using a coherent shared-memory system. The coherent shared-memory system includes a set of caches and a shared memory coupled to each of the caches. The shared memory includes a directory for associating each of a number of addresses in a shared address range with caches that each has a value associated with that address in a storage at that cache. The method includes, at each of the caches, storing a value associated with a first address in the shared address range in the storage of that cache, and while storing the values associating with the first address at each of the caches, associating in the directory the first address with some but not all of the caches which are storing the values associated with the first address. While associating the first address with some but not all of the caches which are storing values associated with said first address, the system provides a coherent memory model for the first address to processors coupled to each of the caches.

In another aspect, in general, the invention is a method for providing a coherent memory model to a number of processors using a coherent shared-memory system. The coherent shared-memory system includes a set of caches each coupled to a different one of a set of processors and a shared memory coupled to each of the caches. The method includes providing at a first cache a first storage associated with a first address in an address range shared by the processors and storing a value in the first storage. This first storage is associated with one of multiple operating modes. A first memory instruction related to the first address is received from a first processor coupled to the first cache. The first memory instruction is processed according to the operating mode associated with the first address. If the first storage is associated with a first of the operating modes, processing the instruction includes causing a value associated with the first address to be transferred between the shared memory and the first cache. If the first storage is associated with a second of the operating modes the memory instruction is processed without necessarily causing a value associated with the first address to be transferred between the shared memory and the first cache.

The invention can include one or more of the following features:

A second storage associated with the first address is provided at a second cache and the second storage is associated with a different one of the operating modes than the operating mode with which the first storage is associated.

The received first memory instruction can be an instruction to make a value associated with the first address at the first cache accessible to processors other than the first processor. For instance, the first memory instruction is a commit instruction. If the value at the first address is dirty and in a first mode, such as a writeback mode, processing the commit instruction causes the dirty value to be transferred to the shared memory so that it is accessible to other processors; if the first address is dirty and in a second mode, such as a mode in which the first processor has exclusive ownership of the address, then the commit instruction does not cause the dirty value to be transferred to the shared memory.

The first memory instruction can also be an instruction that causes a value stored by another of the processors at the first address to be retrieved by the first processor. For instance, the first memory instruction is a reconcile instruction. If the first address is clean and in a first mode, such as a mode in which the first cache is not informed of updates to the shared memory caused by other processors, processing the reconcile instruction causes a subsequent load instruction to transfer a value for the first address from the shared memory to the first cache. If the first address is clean and in a second mode, such as a writer push or an exclusive ownership mode, then the reconcile instruction does not cause a value for the first address to be transferred from the shared memory to the first cache on a subsequent load instruction.

Aspects of the invention include one or more of the following advantages:

Designing a memory system according to the invention provides a way of producing a correct implementation of a memory system without having to consider the specific characteristics of a policy. This allows implementation of complex policies, such as heuristic adaptation of the memory system, while guaranteeing that the overall system remains correct, that is, it correctly implements the semantics of the memory instructions processed by the system.

A memory system in which a directory identifies some caches that hold a particular address but does not necessarily identify all caches that hold that address allows use of limited capacity directories which maintaining a coherent memory model for processors coupled to all caches that hold the address. In this way, if a small number of caches are accessing an address, they may be all identified in the directory and those caches can be notified by the shared memory when other caches have updated their value at that address. If a large number of additional processors then access the same address, they do not have to be represented in the directory. A shared memory can choose how to make use of a limited capacity directory, for instance, by choosing caches to represent in the directory based on a pattern of memory operations. A directory can be designed to have a limited capacity without having to be sized for the worst case.

A memory system in which a cache can hold an address in one of a number of modes which affect processing of memory instructions for that address has an advantage enabling selection of the mode to best match the access characteristics for that address. Since the system provides coherency for that address regardless of the mode, processors accessing the address are guaranteed that their memory instructions will be executed consistently with the semantics of those memory instructions.

Other features and advantages of the invention are apparent from the following description, and from the claims.

DESCRIPTION OF DRAWINGS

FIGS. 4A–D are state transition tables for the Base micro-protocol;

FIG. 4A is a state transition table for the mandatory processor rules for the Base micro-protocol;

FIG. 4B is a state transition table for the voluntary cache rules for the Base micro-protocol;

FIG. 4C is a state transition table for the mandatory cache rules for the Base micro-protocol;

FIG. 4D is a state transition table for the mandatory shared-memory rules for the Base micro-protocol;

FIGS. 6A–E are state transition tables for the Writer-Push micro-protocol;

FIG. 6A is a state transition table for the mandatory processor rules for the Writer-Push micro-protocol;

FIG. 6B is a state transition table for the voluntary cache rules for the Writer-Push micro-protocol;

FIG. 6C is a state transition table for the mandatory cache rules for the Writer-Push micro-protocol;

FIG. 6D is the state transition table for the voluntary shared-memory rules for the Writer-Push protocol;

FIG. 6E is a state transition table for the mandatory shared-memory rules for the Writer-Push micro-protocol;

FIGS. 8A–E are state transition tables for the Migratory micro-protocol;

FIG. 8A is a state transition table for the mandatory processor rules for the Migratory micro-protocol;

FIG. 8B is a state transition table for the voluntary cache rules for the Migratory micro-protocol;

FIG. 8C is a state transition table for the mandatory cache rules for the Migratory micro-protocol;

FIG. 8D is the state transition table for the voluntary shared-memory rules for the Migratory protocol;

FIG. 8E is a state transition table for the mandatory shared-memory rules for the Migratory micro-protocol;

FIGS. 12A–E are state transition tables for the Integrated protocol;

FIG. 12A is a state transition table for the mandatory processor rules for the Integrated protocol;

FIG. 12B is a state transition table for the voluntary cache rules for the Integrated protocol;

FIG. 12C is a state transition table for the mandatory cache rules for the Integrated protocol;

FIG. 12D is the state transition table for the voluntary shared-memory rules for the Integrated protocol; and FIG. 12E is a state transition table for the mandatory shared-memory rules for the Integrated protocol.

DESCRIPTION

U.S. application Ser. No. 09/300,641 (hereinafter the "parent application") describes a multiple processor computer system and describes semantics of memory instructions and various approaches to implementing a memory system to support those instructions. The parent application is incorporated herein in its entirety by reference. The memory instructions introduced in the parent application decompose load and store instructions into finer-grain instructions, which operate on a local semantic cache each associated with an instruction processor. Multiple caches are coupled to a shared memory. The memory instructions introduced in the parent application include LoadL ("Load Local"), StoreL ("Store Local"), Reconcile, Commit and Fence. The semantics of these instructions is that from the point of view of an instruction processor the LoadL and StoreL instructions control the transfer of data between a cache and instruction processor, while the Reconcile and Commit instructions control or constrain the transfer of data between a cache and the shared memory. The instructions also include a set of Fence instructions that enforce an order in which other memory instructions are issued by an instruction processor and processed by the memory system. The semantics of the Commit, Reconcile and Fence instructions form the Commit-Reconcile-Fence (CRF) model upon which the cache protocols described below are founded.

U.S. Provisional Application No. 60/131,229 (hereinafter the "provisional application") includes a description of an adaptable cache coherence protocol that makes use of the semantics of the CRF model described in the parent application. The provisional application is incorporated in its entirety by reference. This approach to memory system design is also described in "Design and Verification of Adaptive Cache Coherence Protocols," a Ph.D. thesis submitted by Xiaowei Shen to the Massachusetts Institute of Technology in February 2000 (hereinafter the "thesis"), which is incorporated herein by reference in its entirety.

Related to terminology in the following description, in the parent application, the term "sache" is used to refer to a semantic cache, that is, to a cache operating to implement the semantics of the finer-gain memory instructions introduced in the parent application. In the description below, the term "cache" is used to include "sache," and "cache" is used rather than "sache" for consistency with more common usage. Also related to terminology, storage in the memory system is, at least conceptually, arranged in cells, each holding a value for a particular address. In the description below, references to an attribute of an address, such as its value or its state, generally refer to the attribute stored in the cell associated with that address.

Figure 1:
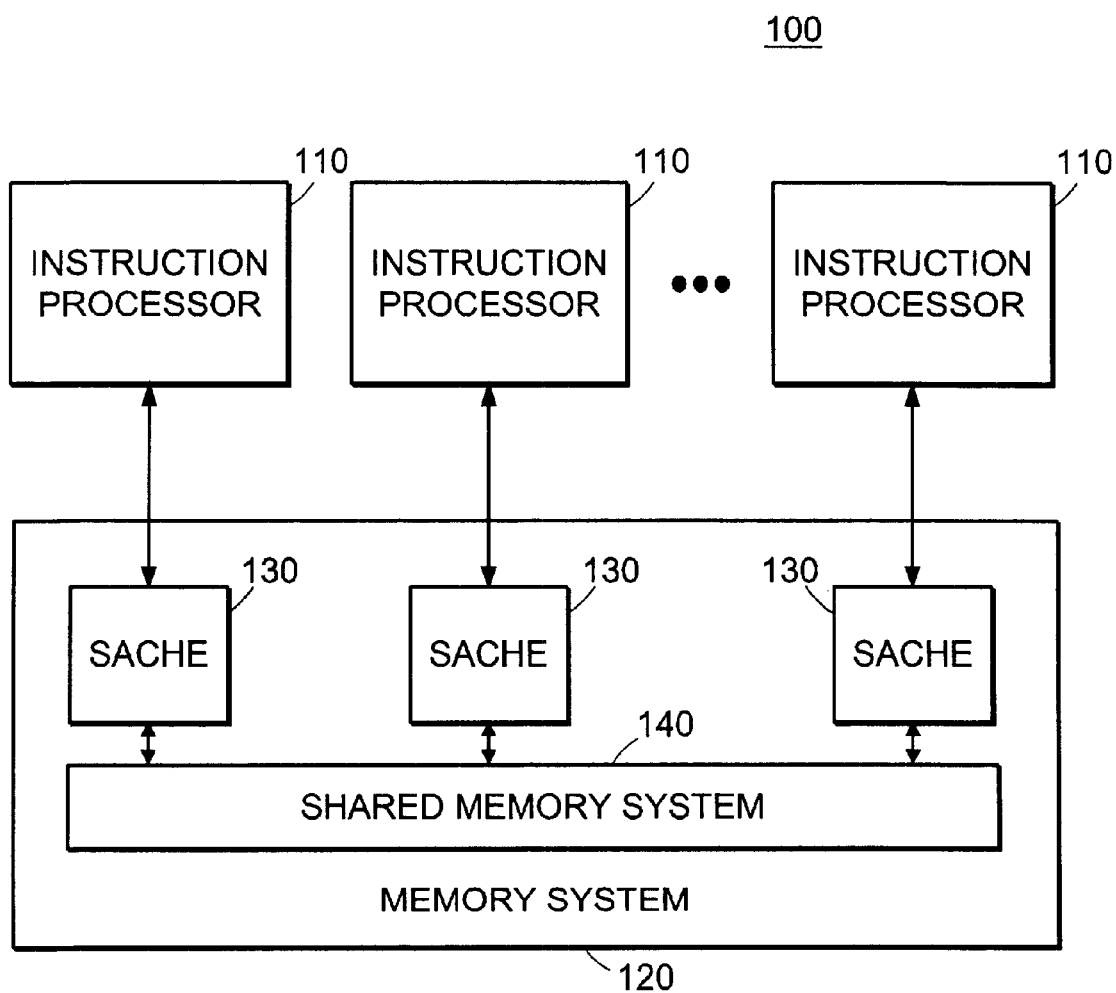
FIG. 1 illustrates a multiple processor computer system that includes a memory system that has a cache associated with each processor and a shared-memory system accessible to all the processors.
Figure 2:
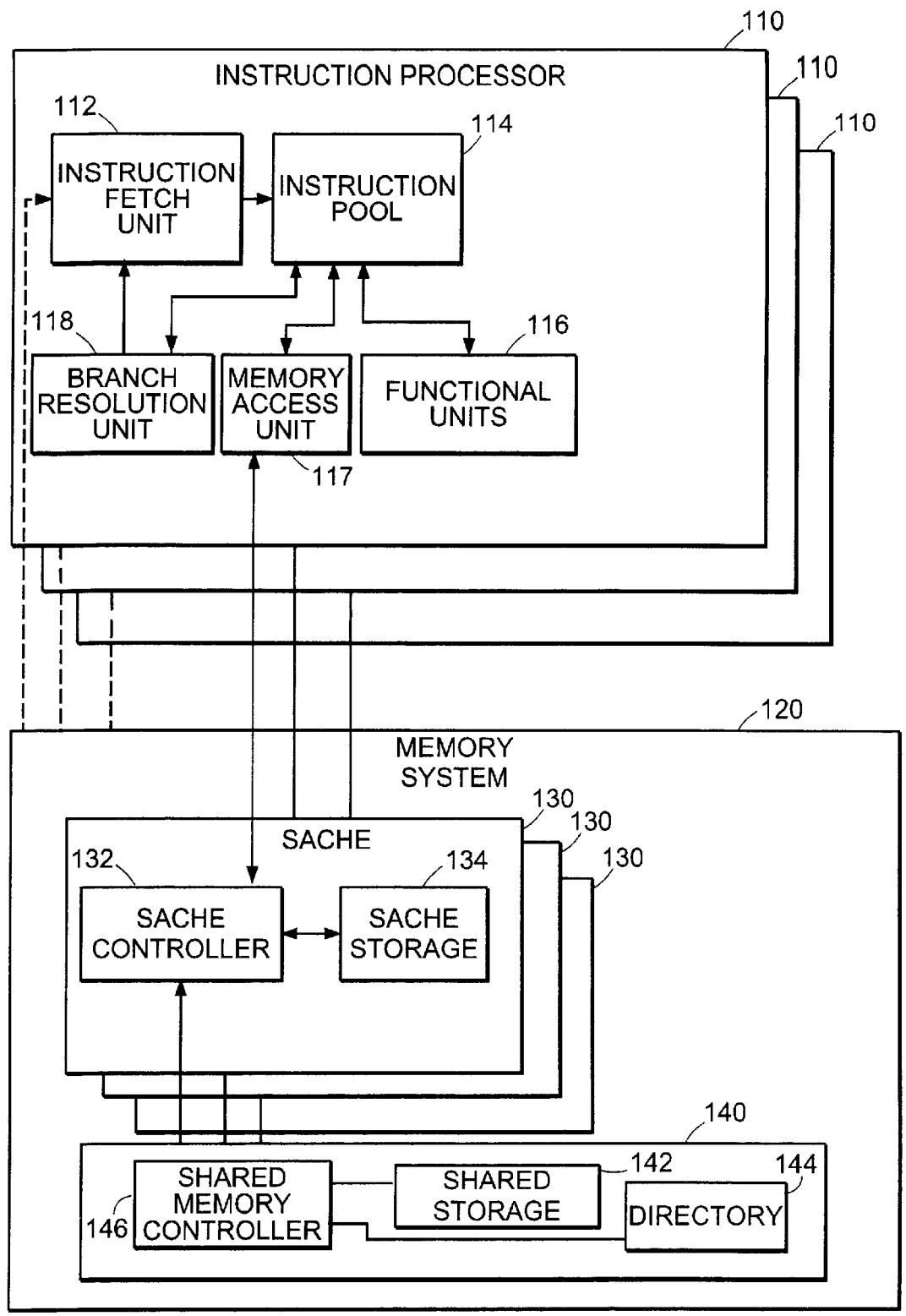
FIG. 2 illustrates the logical structure of the instruction processors and of the memory system.
Figure 3:
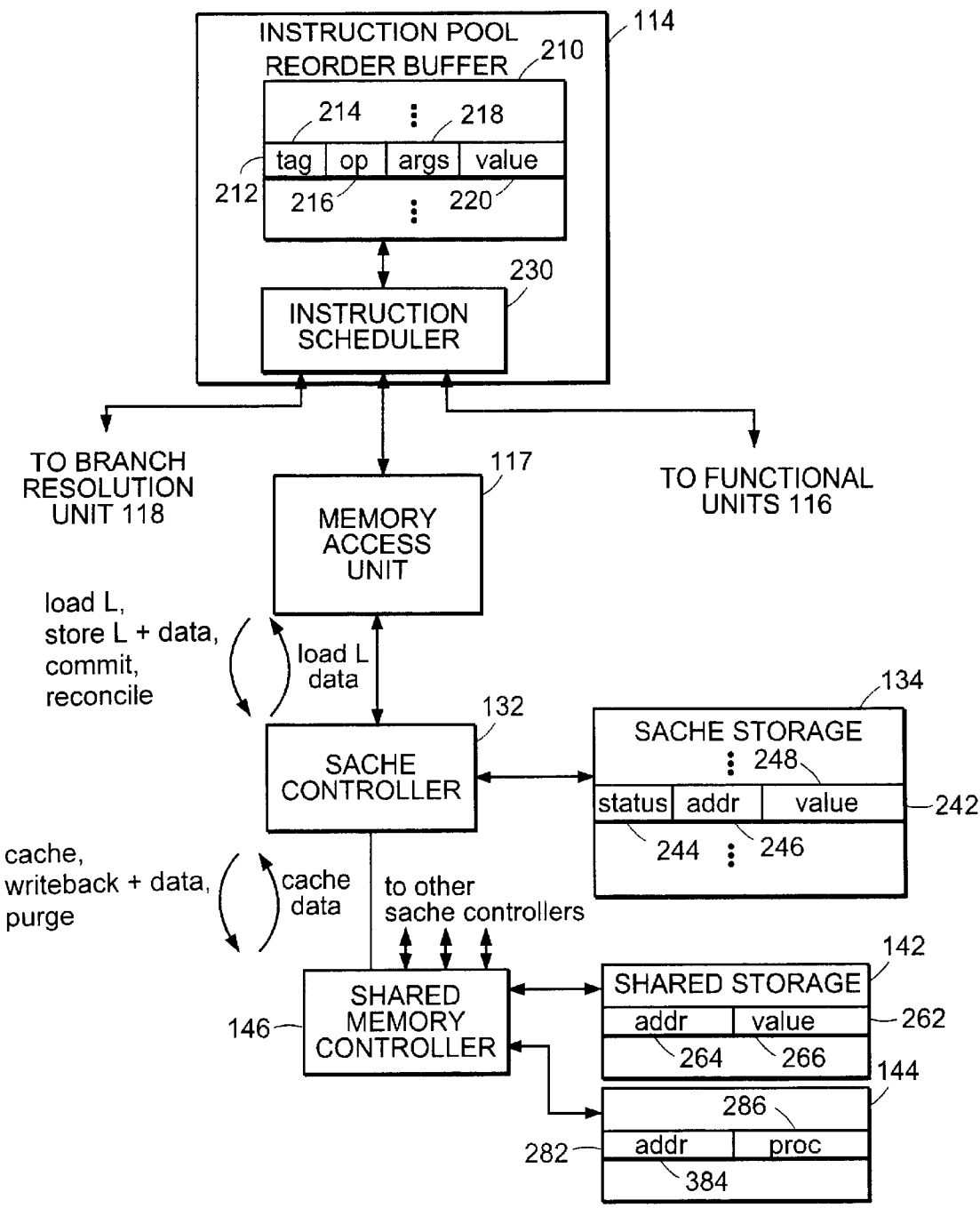
FIG. 3 illustrates communication paths used to access data storage from an instruction processor.

1 Architecture (FIGS. 1–3)

Referring to FIG. 1, a multiple processor computer system 100 embodying the invention includes multiple instruction processors 110 coupled to a memory system 120. Associated with each instruction processor 110, memory system 120 has a separate memory subsystem, a cache ("semantic cache") 130, coupled directly to the instruction processor 110 and coupled to a shared-memory system 140. Each cache 130 is similar to a memory cache found in many conventional cache-based computer systems in that it provides faster memory access (lower latency) than can generally be provided by shared-memory system 140 alone. In embodiments of this invention, instruction processors 110 execute memory access instructions that have semantics defined in terms of the two-layer hierarchical structure of the memory system, which is made up of caches 130 and shared-memory system 140. The memory access instructions control or at least constrain when data is transferred between a cache and the shared-memory system.

Referring to FIG. 2, a representative instruction processor 110 has a general structure found in many current microprocessors. An instruction fetch unit 112 retrieves stored machine instructions for a computer program from memory system 120 or from another instruction storage such as an instruction memory cache, and passes them to an instruction pool 114. Instruction fetch unit 112 processes the stored machine instructions prior to passing them to instruction pool 114, for instance renaming logical register references in stored machine instructions to identifiers of physical storage locations within the processor.

Instructions in instruction pool 114 are passed to functional units 116, including, for example, an arithmetic unit, to a memory access unit 117, and to a branch resolution unit 118. Functional units 116 pass results back to instruction pool 114 where these results are typically used as operands in other pending instructions. Memory access unit 117 communicates with memory system 120, for instance to load or to store data in memory system 120. Memory access unit 117 provides the data loaded from memory system 120 to instruction pool 114 where this loaded data is typically used as an operand of another pending instruction. Branch resolution unit 118 accepts branch instructions from instruction pool 114 and provides information to instruction fetch unit 112 so that the instruction fetch unit accesses the machine instructions appropriate to flow control of the program being executed.

In general, processor 110 executes multiple instructions concurrently. Instruction pool 114 therefore may include multiple instructions that it has issued by sending them to functional units 116, memory access unit 117, or branch resolution unit 118 but that have not yet completed. Other instructions in instruction pool 114 may not yet have been issued by sending them to one of the units, for example, because the instructions require as operands the result from one of the issued instructions which will be returned by unit executing the instruction. Instruction pool 114 does not necessarily issue instructions in the order that they are provided to it by instruction fetch unit 112. Rather instructions may be issued out of order depending on the data dependencies and semantics of the instructions themselves.

Referring still to FIG. 2, memory system 120 includes one cache 130 for each instruction processor 110, and shared-memory system 140. Each cache 130 includes a cache controller 132 and a cache storage 134. Cache storage 134 includes data storage which associates address, data, and status information for a limited portion of the address space accessible from instruction processor 110. Cache controller 132 communicates with memory access unit 117. Memory access unit 117 passes memory access messages to cache controller 132 in response to memory access instructions issued by instruction pool 114. Cache controller 132 processes these memory access messages by accessing its cache storage 134, by communicating in turn with shared-memory system 140, or both. When it has finished processing a memory access message, it sends a result or acknowledgment back to memory access unit 117, which in turn signals to instruction pool 114 that the corresponding memory access instruction has completed.

Shared-memory system 140 includes a shared storage 142 for holding data values associated with particular global addresses. To support some of the cache protocols described below, shared-memory system 140 optionally includes a directory 144 that hold information related to which caches 130 have active copies of values in shared storage 142. As will be discussed further below, directory 144 does not generally include information about all caches that hold copies of values in shared storage 142, but only includes information related to caches that hold values in particular modes or states of the cache coherence protocol.

Referring to FIG. 3, instruction pool 114 includes a reorder buffer 210 and an instruction scheduler 230. Reorder buffer 210 holds a limited number of instructions 212 (e.g., 16 instructions) that come from instruction fetch unit 112 (FIG. 2). Instructions are retired from reorder buffer after they are no longer needed, typically after they have completed execution or are determined not to be needed as a result of a branch instruction. In this embodiment, each instruction 212 includes a tag 214 that is unique to the instructions in reorder buffer 210, an identifier of the operation for that instruction, op 216, operands 218 for that operation, and a value 220 that results from the execution of the instruction. Other embodiments have alternative structures for instruction pool 114. For instance, rather than storing the values resulting from execution of instructions directly with the instructions in the reorder buffer, a separate memory area is used and referred to by the instructions in the reorder buffer.

Based on the semantics and availability of operands of instructions in reorder buffer 210, as well as availability of processing units, instruction scheduler 230 determines which instructions in reorder buffer 210 may be issued and sent to one of the processing units. Memory access instructions are sent to memory access unit 117 which in turn communicates with its corresponding cache controller 132.

Referring still to FIG. 3, cache storage 134 includes a limited number (e.g., 128K) of cells 242, each holding an address 246, and a value 248 and a status 244 associated with that address. Status 244 can take on the value including Clean or Dirty, status related to transient states while operations are in progress, and as will be described further below can include a status related to adaptation of the cache protocol for the address. In general, a cell is Clean if the value has been retrieved from shared-memory system 140 and has not yet been modified by instruction processor 110. When instruction processor 110 modifies the value for an address, the status becomes Dirty. Status 244 can take on the value CachePending when the cache controller 132 is awaiting a value for the address from shared-memory system 140, and the value WbPending when the cache controller has sent the value to the shared-memory system, but has not yet received an acknowledgment that the value has been written and is accessible to the other processors.

In the discussion below, the notation Cell(address,value, status) is used to denote that cache storage 134 includes a cell 242 with the indicated address, value, and status. A "-" is used to indicate any value. The notation Cell(address,-, Invalid) is used to denote that there is no cell 242 with the indicated address in cache storage 134. Also, the status (or state) of an address in the cache storage refers to the status of the cell that identifies the address, or Invalid if there is no such cell, and the value of an address in the cache storage refers to the value in a cell that identifies the address.

Referring again to FIG. 3, shared-memory system 140 includes shared storage 142 which includes a number of cells 262 each associating an address 264 with a value 266. Typically, the address 264 is not explicitly stored and is rather related to the hardware address of the location storing the value in a data storage device. The shared-memory system also includes directory 144. Directory 144 holds a number or records 282, each associating an address 284 with a number of identifiers 286 of processors (or equivalently the caches 130 associated with those processors) that have copies of the value of address 284.

2 Memory Instructions

In the parent application, the semantics of the LoadL, StoreL, Commit, Reconcile, and Fence instructions were defined in terms of the behavior that a processor executing those instructions would be guaranteed. These semantics are summarized as follows:

| Instruction | Semantics |
| --- | --- |
| LoadL(addr) | If cache 130 includes a cell holding address addr and value val, then execution of this LoadL instruction results in the value val. If there is no cell in cache 130 holding addr, then execution of the LoadL does not complete (i.e., the instruction is stalled) until a cell for address addr is created and the value val stored at address addr in shared-memory system 140 is passed from the shared-memory system to cache 130 and stored in the newly created cell in the cache. The status of that new cell is set to Clean. |
| Reconcile(addr) | If cache 130 includes a cell holding address addr, that has a status Clean, that cell is purged from cache 130 such that, for instance, a subsequent LoadL addr instruction will result in a value that will have been retrieved from address addr in shared-memory system 140. This subsequent LoadL is guaranteed to result in a value that was stored at address addr in the shared-memory system at some time after this Reconcile instruction was issued. If cache 130 does not hold address addr, or address addr has a status Dirty, the Reconcile instruction behaves like a no-op. |
| StoreL(val,addr) | If cache 130 includes a cell holding address addr, then execution of this StoreL instruction results in the value val being stored at that cell, and the status of the cell being set to Dirty. If there is no cell in cache 130 holding addr, then a storage cell is first created for address addr. |
| Commit(addr) | If cache 130 includes a cell holding address addr that has a status Dirty, then the value at that cell is passed to shared-memory system 140 and stored at address addr. The status of the cell is changed to Clean. If cache 130 does not hold address addr, or address addr has a status Clean, then this Commit instruction does not modify or transfer any data. |

-continued

| Instruction | Semantics |
|---|---|
| $Fence_{WR}(addr1,addr2)$ | All Commit(addr1) instructions prior to the Fence instruction must complete prior to any subsequent Reconcile(addr2) instruction being issued (for the particular addresses addr1 and addr2 specified in the Fence instruction). |
| $Fence_{WW}(addr1,addr2)$ | All Commit(addr1) instructions prior to the Fence instruction must complete prior to any subsequent StoreL(addr2) instruction being issued. |
| $Fence_{RR}(addr1, addr2)$ | All LoadL(addr1) instructions prior to the Fence instruction must complete prior to any subsequent Reconcile(addr2) instruction being issued. |
| $Fence_{RW}(addr1,addr2)$ | All LoadL(addr1) instructions prior to the Fence instruction must complete prior to any subsequent StoreL(addr2) instruction being issued. |

3 Instruction Processing Rules

Operation of multiple processor computer system 100 (FIG. 1) is modeled using streams of instructions passing between instruction processors 110 and their correspond caches 130, responses streams passing back from the caches 130 to the instruction processors 110, and messages streams passing between each cache 130 and shared-memory system 140. In the parent application, processing of messages was generally described using pseudo-code, for example, describing how a controller in a cache 130 processes messages with memory instructions it receives from its instruction processor 110.

In the description below, valid operation of instruction processors 110, caches 130 and shared-memory system 140 is described using a set of rules that are specified as part of a term rewriting system (TRS). The general structure of a TRS rule is that it has a left-hand side term, a predicate, and a right-hand side term. If the predicate is true, and the left-hand side term has a pattern that matches the state of the system, then the rule can be applied to rewrite the left-hand side term to be the right-hand side term. A fuller description of use of TRS in processor and memory system specifications is found in X. Shen and Arvind, "Using Term Rewriting Systems to Design and Verify Processors," IEEE Micro May/Jun. 1999, as well as in Chapter 2 of the thesis.

The rules that define operation of the system form two non-overlapping sets. The first is a set of "mandatory" rules and the second is a set of "voluntary" rules. In general, the mandatory rules must be applied with some degree of fairness to ensure liveness of the system. Voluntary rules, on the other hand, do not have any fairness requirement. Application of voluntary rules is purely discretionary. For example, in some embodiments decisions to apply voluntary rules use heuristics based on adaptivity and performance considerations. The combination of mandatory and voluntary rules is such that proper operation (that is, operation consistent with the semantics of the memory instructions) is guaranteed for any choices of application of the voluntary rules.

In general, mandatory rules relate to actions that are enabled by events, such a cache receiving a message from an instruction processor or for the shared memory. Voluntary rules, in contrast, are generally enabled if some cache or memory cell is in appropriate state. For example, a mandatory writeback rule requires a cache to write a dirty copy back to the shared memory once a writeback request is received from the shared memory, while a voluntary writeback rule allows the same operation as long as the cache state of the address shows that the data has been modified.

In the description that follows, state transition tables are used to describe the cache coherence protocols. In general, each row in state transition table represents one TRS rule and has a pre-condition, an action, and a post-condition shown as separate columns in the table. These state transition tables with an understanding of TRS are sufficient to allow one to derive precise TRS rules. Implementation of the protocol then follows from the precise TRS rules. The precise TRS rules also allow one to formally verify the correctness of the protocol. Using the precise rules, one can determine software or hardware implementations that are consistent with the rules, for instance by directly mapping the rules into hardware logic or software data structures that are accessed in operation.

4 Integrated Protocol

An integrated cache protocol according to this invention makes use of an integration of a number of "micro-protocols." In its full implementation, the integrated cache protocol includes adaptation within each particular micro-protocol, as well as switching between particular micro-protocols. This adaptation may occur independently for different addresses, that is, different micro-protocols can effectively be used for different addresses at the same time. Also, in certain situations, the integrated cache protocol allows one cache to operate according to one micro-protocol while another operates according to another micro-protocol for the same address.

The integrated cache protocol described below makes use of three micro protocols called Base, Writer-Push (WP), and Migratory. These protocols are described in the parent application in part using pseudo-code descriptions for the Base and Writer-Push protocols. The description below makes use of state transition tables. Each of these micro-protocols is first described below, followed by a description of the integrated protocol.

4.1 Base Micro Protocol (FIGS. 4A–D, 5)

The base micro protocol corresponds to the operation of a cache ("sache") described in Section 5.2 and illustrated in the pseudo-code shown in FIGS. 4A–E of the parent application. Four sets of rules define the behavior of the system according to the Base micro-protocol. Referring to FIGS. 4A–D, mandatory processor rules 410 govern processing of messages that pass between memory access unit 117 (FIG. 2) and cache controller 132. Voluntary C-engine rules 420 and mandatory C-engine rules 430 govern operation of cache controller 132 with respect to its communication with shared-memory controller 146. Finally, mandatory M-engine rules 440 govern operation of shared-memory controller 146 with respect to its communication with a cache controller 132.

Figure 5:
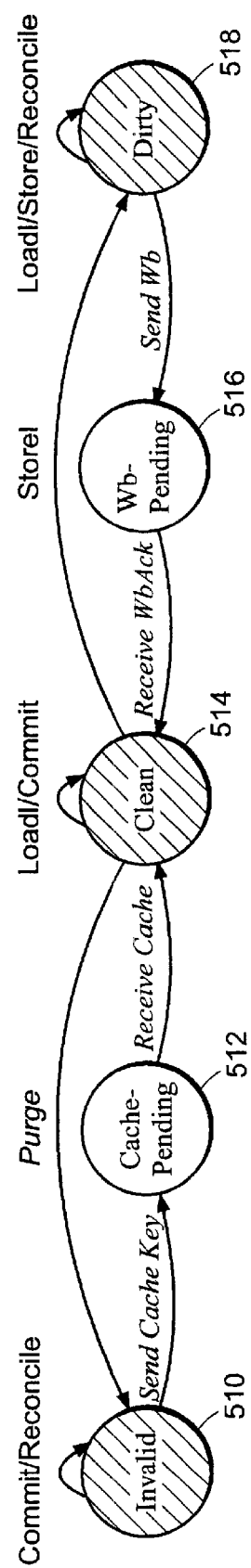
FIG. 5 is a state transition diagram for the status of a cell in the cache storage in the Base micro-protocol.

Before considering the particular rules, it is useful to consider the states in a cache 130 that can be associated with a particular address. Referring to FIG. 5, a particular address can be in one of five states. Transition between the states are generally associated with the cache controller 132 sending or receiving a message from either memory access unit 117 or shared-memory controller 146. Initially, an address is in an invalid state 510. In the invalid state, the address is generally not associated with a particular cell 242 in cache storage 134. After cache controller 132 sends a cache request (CacheReq) message for the address to shared-memory controller 146, the address enters a CachePending state 512. The CacheReq message informs the shared memory that the cache needs the value at the specified address, for example to provide that value to the instruction processor coupled to the requesting cache. In this state, the address will have an associated cell 242 in cache storage 134 in which status 244 indicates its state. After cache controller receives a Cache message with the value stored at that address in shared storage 142, the state for the address becomes Clean 514 and the received value is stored in the value field 248 of the address's cell. If cache controller 132 then purges an address which is in clean state 514, the new state is invalid 510, thereby allowing the cache controller to reclaim the cell in cache storage 134. When cache controller 132 receives StoreL command from memory access unit 117 for an address in Clean state 514, the new state is Dirty 518. After the cache controller sends a Writeback request (Wb) message to the shared-memory controller, the state becomes WbPending 516. When the cache controller receives the WbAck acknowledgment message from the shared-memory controller indicating that the written back value is now accessible to other processors, the state of the address becomes Clean 514.

Referring back to FIGS. 4A–C, mandatory processor rules 410 and voluntary and mandatory C-engine rules 420, 430 govern the details of the state transitions shown in FIG. 5. FIG. 4A relates to messages which pass between memory access unit 117 and cache controller 132. The first column, Instruction 412, indicates which memory instruction is being processed. That is, a rule may be applicable if a message with that instruction is held in a processor to memory buffer passing from memory access unit 117 to cache controller 132. The second column, Cstate 414, indicates the state in the cache of the address referenced in the instruction in the first column. For example, Cell(a,v,Clean) indicates that the address a is in Clean state 514 (FIG. 5) and has a value v stored in corresponding cell 242 in cache storage 134 (FIG. 3). Also, the notation "a∉cache" is equivalent to Cell(a,-,Invalid), indicating that address a is invalid and typically not allocated any storage in cache storage 134. The third column, Action 416, is the action that is carried out if the Instruction 412 and Cstate 414 match for a particular address. The action "retire" corresponds to removing the message with the instruction from the processor to memory buffer and sending a message from cache controller 132 to memory access unit 117, for instance with a requested value for a LoadL instruction, or an acknowledgment for a StoreL command. The action "stall" corresponds to keeping the instruction in the processor to memory buffer for later processing. The fourth column, Next Cstate 418, is the state of the address after the action is taken. Action 410 can also include an indication that cache controller 132 sends a message to shared-memory controller 146. The notation "<message>→H" indicates that message is sent to the "home" (H) for the address. In this embodiment, the home for an address is shared-memory system 140 (and shared-memory controller 146 in particular).

The specific rules in mandatory processor rules 410, which are labeled P1 through P20 for reference, match the semantics of the memory instruction outlined above in Section 2 and the state transition diagram shown in FIG. 5. Rules P1–P5 related to a LoadL instruction. If the state is Clean (rule P1) or Dirty (rule P2), then the value in cache storage is immediately returned to the memory access unit and the instruction is retired. If the state is WbPending (rule P2) or CachePending (rule P4) then the instruction is stalled pending a change of state resulting from application of another rule. If the address is invalid (rule P5), the instruction stalls, and cache controller 132 sends a CacheReq message to shared-memory controller 146. Rules P6–P10 are similar to rules P1–P5 except that they relate to the StoreL instruction. Similarly, rules P11–P15 relate to the Commit instruction and rules P16–P20 relate to the reconcile instruction.

Turning to FIG. 4B, cache controller 132 may apply one of three voluntary rules, VC1–VC3. In voluntary C-engine rules 420, the Action column refers to an action carried out by cache controller 132. Rule VC1 is a "purge rule." If an address is in the Clean state, it may be purged at any time, leaving that address in the Invalid state. Rule VC2 is a "writeback rule." An address in cache storage 134 that has a Dirty state may have its data written back to the shared-memory system at any time. The next state for the address is WbPending and is expected to change to Clean once a WbAck message is received from the shared-memory controller (see rule MC2 described below). Rule VC3 is the "cache rule." Data in shared memory 140 at an address that is invalid in the cache can be requested by cache controller 132 at any time by sending a CacheReq message to the shared-memory controller. The next state is CachePending until a Cache message from the shared-memory controller is received at which time the state changes to Clean.

Referring to FIG. 4D, mandatory M-engine rules 440 relate to processing of messages received by shared-memory controller 146 from cache controller 132. The "Msg from id" column 442 indicates the message received from the cache controller. Column Mstate 444 and column Next Mstate 448 indicate the value stored in a cell 262 in shared storage 142. Column Action 446 indicates what message is sent back to that cache controller ("id") in response to the message received from the cache controller. Rule MM1 governs the shared-memory system providing a value to a cache, for instance, when cache controller 132 sends a CacheReq message to shared-memory controller 146 as a result of applying rule P5 (LoadL), rule P10 (StoreL), or rule VC3 (cache rule). Rule MM2 governs storing a value in the shared-memory system in response to cache controller 132 sending a Wb command as a result of applying rule P12 (Commit of a Dirty cell) or rule VC2 (writeback rule).

Referring to FIG. 4C, mandatory C-engine rules 430 relate to cache controller 132 processing messages from shared-memory controller 146. Rule MC1 governs a transition from a CachePending state to a Clean state when the cache controller receives a value from the shared memory in response to a CacheReq message. Rule MC2 governs a transition from a WbPending state to a Clean state when the cache controller receives an acknowledgment from the shared memory in response to a Wb message.

4.2 Writer Push micro protocol (FIGS. 6A–E, 7)

The Writer-Push (WP) micro-protocol corresponds to the operation of a cache described in Section 6.4.1 and illustrated in the pseudo-code shown in FIGS. 6A–G of the parent application. In this micro-protocol, the "writer" cache is responsible for informing potential "readers" caches to have their stale copies, if any, purged in time. Therefore, in this micro-protocol, a Commit operation on a Dirty cell in one cache 130 can be a lengthy process since it does not complete until after Clean copies of the address are purged from all other caches 130. On the other hand, a Reconcile operation on a Clean cell can complete without requiring a cache to purge the address so that the data can be accessed by subsequent instructions without necessarily causing a cache miss. The micro-protocol is well suited when some instruction processors read a memory location many times using Reconcile and LoadL instructions before the location is modified by another instruction processor using StoreL and Commit instructions.

In the Writer-Push micro-protocol, shared-memory controller 146 (FIG. 3) makes use of directory 144. For each address represented in directory 144, the directory has a state for that address. The state can be a list, denoted C[dir], of the caches that have that address cached in their respective cache storages or a list, denoted T[dir,sm], of the caches of which the shared-memory controller has requested a purge of the address but for which the shared-memory controller has not yet received an acknowledgment of the purge request.

Figure 7:
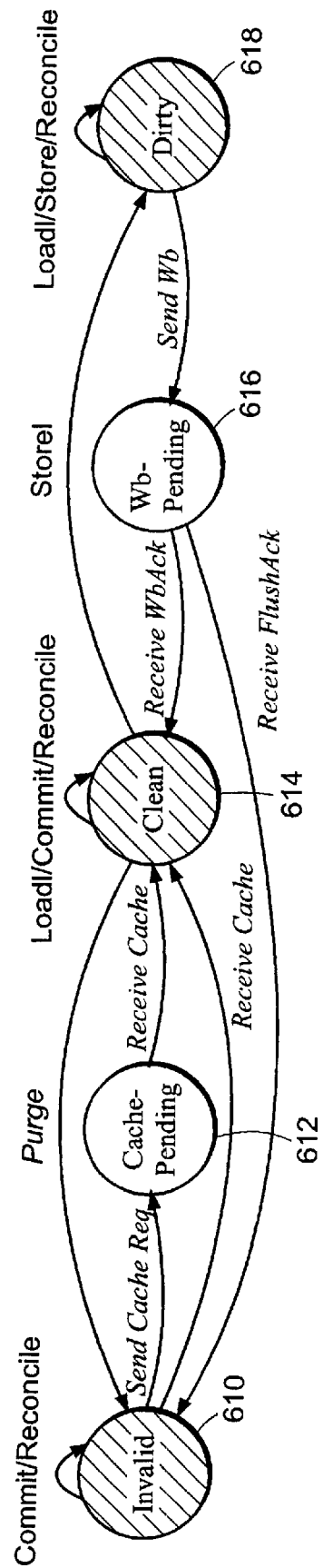
FIG. 7 is a state transition diagram for the status of a cell in the cache storage in the Writer-Push micro-protocol.

Referring to FIGS. 6A–E, five sets of rules define the behavior of the system according to the Writer-Push micro-protocol. Referring to FIG. 7, an address in a cache can be in one of five states that correspond to the states shown in FIG. 5 for the Base micro-protocol. As will be described further below, state transitions are similar to those in the Base micro-protocol. However, a cache may receive an unsolicited message with a value from the shared-memory system for an address that is in the Invalid state. This results in Clean state 614 for that address. Also, in WbPending state 616, a cache may receive a message from the shared-memory controller to flush the address resulting in Invalid state 610 rather than receiving an writeback acknowledgment which results in Clean state 614 for the address.

Referring to FIG. 6A, mandatory processor rules 610 are similar to mandatory processor rules 410 (FIG. 4A) for the Base micro-protocol. One difference in the rules should be noted. In rule P16, which corresponds to cache controller 132 receiving an Reconcile message for an address that is the Clean state, in the write-push micro-protocol, the address remains in the Clean state and the instruction is immediately retired, as compared to Invalidating the address and stalling the instruction as indicated in rule P16 in the mandatory processor rules table 410 for the Base protocol.

Referring to FIG. 6B, voluntary C-engine rules 620 are also similar to voluntary C-engine rules 420 (FIG. 4B) for the base protocol. One difference is in rule VC1, the "purge rule," according to which cache controller 132 sends a Purge message to shared-memory controller 146 to indicate that it is invalidating the address. Note that in the Base micro-protocol, the shared-memory controller is not informed when a cache purges an address.

Referring to FIGS. 6C and 6E, mandatory C-engine rules 630 and mandatory M-engine rules 650 differ significantly from the corresponding rules for the Base micro-protocol. Referring to FIG. 6E, when shared-memory controller 146 receives a CacheReq message from a cache controller 132, according to rules MM1–MM4, how the shared-memory controller processes the message depends on the state of the corresponding address as represented in directory 144. According to rules MM2 and MM4, if the address is already cached in the requestor's cache storage, the cache request is discarded. According to rules MM1 and MM3, if the memory state shows that the address is uncached in the cache, there are two possible cases. According to rule MM3, the cache request is stalled for later processing if the memory state is a transient state; otherwise, according to rule MM1, the memory sends a cache message to supply the data to the requesting cache.

Operation of the shared-memory controller is more complicated for writeback operations, because the memory must ensure that other cache copies of the same address are coherent. According to rule MM5, when the shared-memory controller receives a Wb message, it sends a PurgeReq message to other caches that hold copies for the address. These caches are also added to the transient set T[dir,sm]. Note that the shared-memory controller withholds a writeback acknowledgment to the requesting cache until it has received acknowledgements for all the purge requests. The shared-memory controller uses the transient state T[dir,sm] for the bookkeeping purposes. According to rule MM8, when the shared-memory controller receives Purge messages from the caches in the transient set, it removes those caches from the transient set. According to rules MM9 and MM10, once the transient set is empty, the shared-memory controller updates the shared storage, sends a writeback acknowledgment (WbAck) to the cache that issued the original writeback message.

If the shared-memory receives additional writeback messages for an address that is in the transient state awaiting Purge messages, it records all these writeback messages in the transient state for the address. The suspended messages are resumed when the directory becomes empty. The memory acknowledges each writeback message via a Flush-Ack message (it may chose to acknowledge the last writeback message via a WbAck message since the cache contains the same value as the memory). This ensures that all the stale copies of the address are purged from the caches.

Referring to FIG. 6D, in the writer-push micro-protocol, the shared-memory controller can apply voluntary M-engine rules 640. According to rule VM1, the shared-memory controller may send an unsolicited Cache message to a cache that does not already hold an address without that cache requesting the address. According to rule VM2, the shared-memory controller may send a PurgeReq messages to a caches that holds an address.

Referring to FIG. 6C, cache controller 132 is governed by mandatory C-engine rules 630. Rules MC2 and MC3 correspond to rules MC1 and MC2, respectively, in mandatory C-enginer rules 430 of the Base micro-protocol. These rules relate to processing WbAck and Cache messages from the shared memory. According to rules MC5–MC9, the cache controller responds to a purge request from the shared memory in different ways depending on the state of the address for which it receives the purge request. According to rule MC5, the cache controller purges the Clean data and sends a Purge message to the shared memory. According to rule MC6, in the case that the address is Dirty, the cache controller writes back the dirty copy via a Wb message. According to rules MC7–MC9, a purge request received when an address is in a WbPending, CachePending, or Invalid state is ignored. Finally, according to rule MC1, when a cache receives a Cache message, for example as a result of a shared memory applying voluntary rule VM1, the received value is store and the address is set to the Clean state.

4.3 Migratory Micro-Protocol (FIGS. 8A–E. 9)

The Migratory micro-protocol corresponds to the operation of a cache described in Section 6.4.2 of the parent application. In this micro-protocol, at most one cache at a time has "ownership" of an address, and the ownership of that address "migrates" from one cache to another.

The cache that has a copy of a location responds to Commit and Reconcile messages for that location from its instruction processor without having to communicate with the shared-memory system. In general, prior to purging a location, the cache sends a Writeback message if the location has been Committed, and then sends a Purged message. When the shared-memory controller receives a CacheReq message from a cache and another cache has a copy of the requested location, then the shared-memory controller sends a FlushReq message to that other cache. If that other cache has a Clean copy it deletes the copy and sends a Purge message back to the shared-memory system. If it has a Dirty copy that has not been written back, it sends a Flush message. After the shared-memory system receives the Purge Flush message, it updates the memory and responds to the original Cache request, noting which cache now has a copy of that location.

In the Migratory micro-protocol, shared-memory controller 146 (FIG. 3) makes use of directory 144. For each address that is cached, directory 144 has a state which can take on a value C[id] or T[id], where C[id] indicates the cache id has that address cached in the cache storage and T[id] indicates that the shared-memory controller has requested a flush of the address from cache id but that the shared-memory controller has not yet received an acknowledgment of the purge request.

Figure 9:
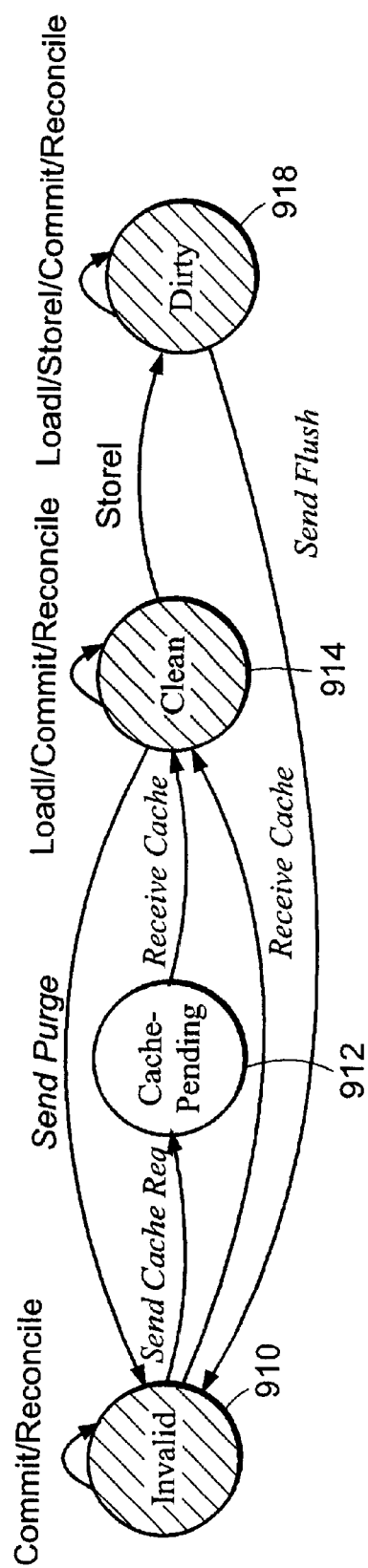
FIG. 9 is a state transition diagram for the status of a cell in the cache storage in the Migratory micro-protocol.

Referring to FIGS. 8A–E, five sets of rules define the behavior of the system according to the Writer-Push micro-protocol. Referring to FIG. 9, an address in a cache can be in one of four states that correspond to the states shown in FIG. 5 for the base micro-protocol, with the exception that in the migratory micro-protocol, the Wbpending state is not reached.

Referring to FIG. 8A, mandatory processor rules 810 are similar to mandatory processor rules 410 (FIG. 4A) for the Base micro-protocol. First, rules related to the WbPending state are not included since the WbPending state is not reached with the Migratory micro-protocol. Another difference is rule P10, which is relates to a Commit instruction when an address is in a Dirty state. In the Migratory micro-protocol, this message is immediately processed by a cache and the shared memory is not necessarily made aware of the Commit. Another difference is rule P13, which relates to a Reconcile instruction when a cell is Clean. In the Migratory micro-protocol, the address remains Clean after the instruction is processed.

Referring to FIG. 8B, according to voluntary C-engine rules 820 cache controller 132 can purge a Clean copy of an address and notify the shared memory of the purge operation via a Purge message (rule VC1). It can also flush a dirty copy and write the data back to the shared memory via a Flush message (rule VC2). Also, a cache controller can send a cache request to the shared memory to request an exclusive copy for an uncached address (rule VC3).

Referring to FIG. 8E, shared-memory controller 146 is governed by mandatory M-engine rules 850. Rules MM1–MM5 relate to the shared-memory controller processing a CacheReq message from a cache controller. According to rule MM1, if no cache has a copy of the address, the shared memory controller replies with a Cache message which provides the value in shared memory of the address, and records which cache now has the exclusive copy in the C[id] indicator. According to rule MM3, if the requesting cache already had the exclusive copy, then the CacheReq message is ignored. According to rule MM2, if some other cache (id,) has an exclusive copy, the cache request is stalled and a FlushReq message is sent to that other cache. The pending flush is indicated in the T[id$_1$] indicator. According to rule MM9, when that other cache replies with a Flush message, the C[id$_1$] indicator is cleared, allowing rule MM1 to be applied to send a Cache message to the cache that sent the original CacheReq message. According to rule MM4, the shared-memory controller stalls a cache request message from a cache while a Purge message is pending from another cache, while according to rule MM5, it ignores a cache request from a cache when a Purge message is pending from that same cache. According to rules MM6 and MM7, a Purge message results in the C[id] indicator being cleared. Similarly, according to rules MM8 and MM9, a Flush message results in the C[id] indicator being cleared and the value in the shared storage being updated.

Referring to FIG. 8D, shared-memory controller 146 may send a Cache message giving exclusive ownership of an address to any cache if there is no other exclusive owner (rule VM1), or send a flush request to any cache that has exclusive ownership of an address (rule VM2).

Referring to FIG. 8C, cache controller 132 processes a Cache message from the shared memory by accepting the value and setting the state of the address to Clean (rules MC1 and MC2). If an address is Clean, Dirty or Invalid, the cache controller processes a FlushReq message by setting the state of the address to Invalid. If the prior state was Clean, the cache controller sends a Purge message to the shared memory, while if the prior state was Dirty, the cache controller sends a Flush message to pass the dirty value to the shared memory.

Referring to FIG. 8B, cache controller 132 may purge any clean address (rule VC1), flush any dirty address (rule VC2), or make a cache request for any address it does not yet exclusively own (rule VC3).

4.4 Integration of Multiple Micro-protocols (FIGS. 10A–B, 11, 12A–E)

The description of the three micro-protocols above each results in a semantically correct implementation of the memory instruction through application of the mandatory rules, and any strategy for application of the voluntary rules. In this section, a combination of these three micro-protocols is described, including rules that allow the micro-protocol associated with a particular address to be dynamically switched while processing requests for that address.

As is described further below, with appropriate handling, the Base micro-protocol can coexist with either the Writer-Push or the Migratory micro-protocol for a particular address. However, in this embodiment, the Writer-Push and Migratory protocols do not coexist concurrently for a particular address.

Figure 11:
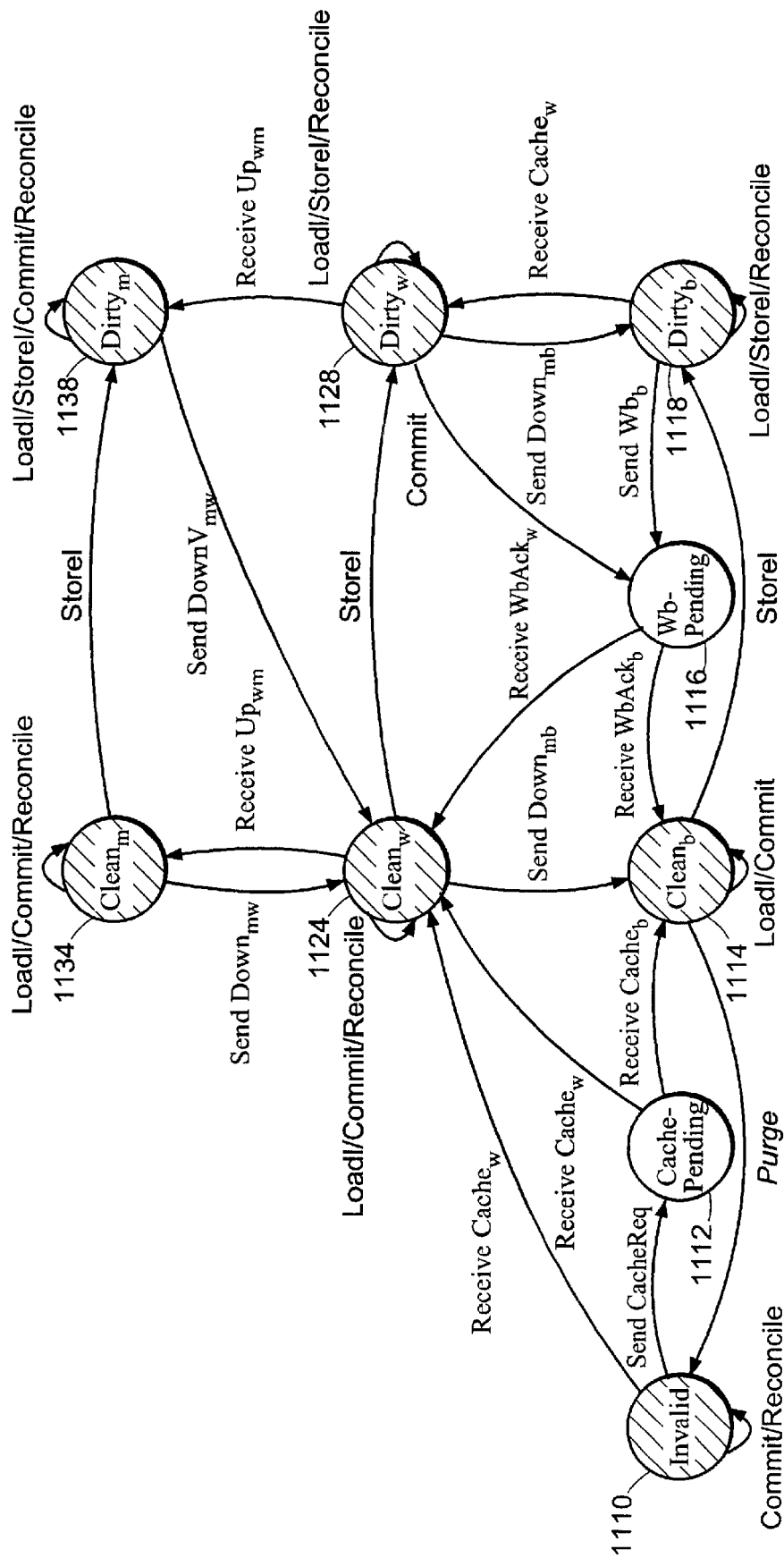
FIG. 11 is a state transition diagram for the status of a cell in the cache storage in the Integrated protocol.

Since different micro-protocols have different treatment for Commit and Reconcile instructions, a cache must be able to tell which micro-protocol is in use for each address. As illustrated in FIG. 11, the possible states of an address are annotated with a subscript to represent the operational micro-protocol: $Clean_b$ and $Dirty_b$ are Base states, $Clean_w$ and $Dirty_w$ are Writer-Push states, and $Clean_m$ and $Dirty_b$ are Migratory states. The protocol draws no distinction between different micro-protocols for an uncached (Invalid) address, or an address cached in a CachePending or WbPending transient states.

Figures 10A, 10B:
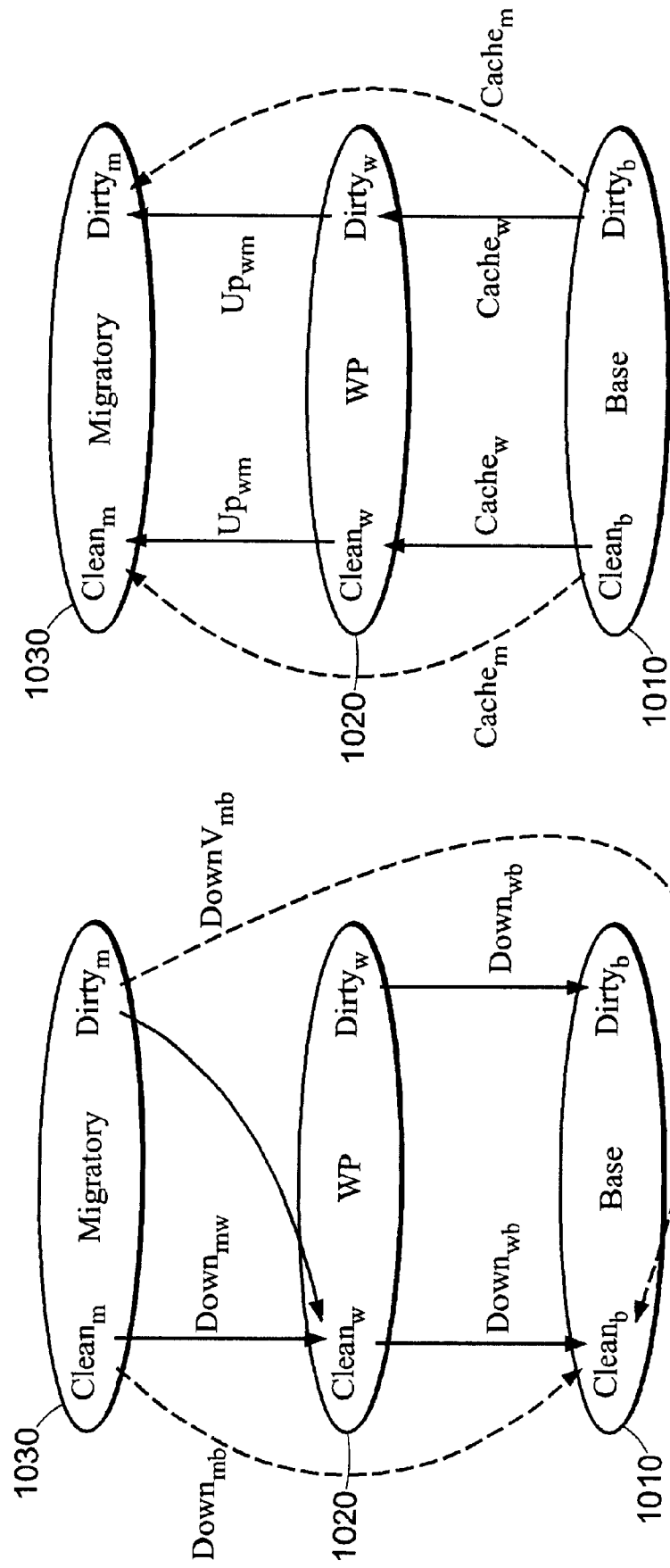
FIGS. 10A–B as state transition diagrams which illustrate protocol upgrade and downgrade operations.

The protocol provides inter-protocol adaptivity via downgrade and upgrade operations. A downgrade operation switches a cache cell to a "less privileged" micro-protocol, while an upgrade operation switches a cache cell to a "more privileged" micro-protocol. FIGS. 10A–B illustrate the state transitions caused by downgrade and upgrade operations, respectively, for an address. Each transition is associated with corresponding protocol message that is generated or received at the cache as indicated by the labels on the arcs in the figure. Referring to FIG. 10A, there are three types of downgrade operations. The first is from a Migratory protocol 1030 to a Writer-Push protocol 1020, the second is from Writer-Push protocol 1020 to Base protocol 1010, and the third is from Migratory protocol 1030 to Base protocol 1010 formed as a composition of the first two downgrade operations.

When a cache downgrades a Dirty Migratory cell, it always writes the data back to the shared memory. This ensures that the memory contains the most up-to-date data for any address that is not cached under the Migratory micro-protocol. Consequently, Migratory cells are only downgraded to be clean Base or Clean Writer-Push cells.

In operation, a cache controller can initiate a downgrade operation voluntarily, or a cache controller must make a mandatory transition as a result of receiving a DownReq message from the shared-memory controller. When a cache cell is downgraded, the cache controller sends a Down message, which indicates the prior and resulting micro-protocols, to inform the shared memory of the downgrade operation.

Referring to FIG. 10B, the shared memory can send an Up message to a cache to upgrade a cache cell from Writer-Push 1020 to Migratory 1030, or from Base 1010 to Writer-Push 1020 or Migratory. A Base-to-Migratory upgrade is a composite operation equivalent to a Base-to-WP upgrade followed by a WP-to-Migratory upgrade. Since the shared memory maintains no information about Base cells, the shared-memory controller does not draw distinction between the situation in which an address is not cached in a cache and the situation in which the address is cached in the cache under Base. Therefore, the $Cache_w$ and $Cache_m$ messages can behave as upgrade messages when the address is cached in a Base state at the destination cache.

Downgrade and upgrade operations can conflict each other when they are performed on the same cache cell simultaneously. For example, a cache can downgrade a cache cell without consulting the memory, while the memory can send an upgrade message to upgrade the cache cell. In this case, the downgrade operation has higher priority in the sense that the cache cell will be eventually downgraded, and the upgrade message will be discarded when it is received.

Referring to FIGS. 12A–E the rules for the integrated protocol have the similar components as the rules for the micro-protocols: mandatory processor rules 1210, voluntary C-engine rules 1220, mandatory C-engine rules 1230, voluntary M-engine rules 1240, and mandatory M-engine rules 1250. In very general terms, the tables of rules for this protocol are formed by first "merging" the rules of each of the micro-protocols, renaming the state indicators C[ ] and T[ ] to include a subscript indicating the micro-protocol they relate to, and renaming certain messages passed between the cache controller and the shared-memory controller according to the micro-protocol being used. Then, rules related to upgrade and downgrade operations are added to enable switching between micro-protocols. Finally, additional changes including those required to ensure correct operation of the protocol are made and the protocol is proved to be a correct implementation of the CRF instruction semantics.

FIG. 12A defines mandatory processor rules 1210 of the integrated protocol. These rules can be summarized as follows:

For a LoadL or a StoreL instruction, if the address is cached in the Clean or Dirty state of any protocol, cache controller 132 supplies the accessed data or an acknowledgment to retire the instruction to memory access unit 117 (rules P1–P6, P10–P15). If the address is Invalid (rules P9, P18), the cache sends a CacheReq message to request a cache copy from the shared memory; the instruction remains stalled until the requested data is received.

For a Commit instruction, if the address is Invalid (rule P27) or cached in the Clean state of any protocol (rules P19, P21, P23) or in the Dirty state of Migratory (rule P24), the cache supplies an acknowledgment to retire the instruction. If the address is cached in the Dirty state of Base (rule P20), the cache controllers sends a $Wb_b$ message to write the data back to the shared memory. If the address is cached in the Dirty state of the Writer-Push protocol (rule P22), the cache controller sends a $Down_{wb}$ message followed by a $Wb_b$ message to the shared memory.

For a Reconcile instruction, if the address is Invalid (rule P36) or cached in the Clean state of the Writer-Push or Migratory protocols (rules P30, P32) or in the Dirty state of any protocol (rules P29, P31, P33), the cache supplies an acknowledgment to retire the instruction. If the address is cached in the Clean state of Base (rule P28), the cache purges the cache cell to allow the instruction to complete.

Instructions received while the address is in the transient CachePending or WbPending states are stalled (rules P7, P8, P16, P17, P25, P26, P34, P35). Referring to FIGS. 12B–C, the cache controller is governed my mandatory C-engine rules 1230 and voluntary C-engine rules 1220. These can be summarized as follows:

A cache can voluntarily purge a clean Base cell (rule VC1).

A cache can voluntarily write Dirty data of a Base cell back to the shared memory via a $Wb_b$ message and set the cache state to WbPending, indicating that a writeback operation is being performed (rule VC2). The cache state will be set to $Clean_b$ or $Clean_w$ when the cache receives a writeback acknowledgment later (rules MC14, MC15).

A cache can voluntarily downgrade a cell from WP to Base, and send a $Down_{wb}$ message to the shared memory (rules VC3 and VC4).

A cache can voluntarily downgrade a cell from Migratory to WP, and send a $Down_{mw}$ or $DownV_{mw}$ message to the memory (rules VC5 and VC6). A DownV message not only indicates that a cell is being downgraded, but also carries the modified value of a cell. The most up-to-date data is always sent back to the shared memory when a Dirty Migratory cell is downgraded.

A cache can send a CacheReq message to the shared memory to request the data for an uncached address; the cache state is set to CachePending to indicate that a cache copy is being requested (rule VC7).

If a cache receives a $Cache_b$ message, it caches the data in the Clean state of Base protocol (rule MC1). Note that the shared memory does not supply a Base copy without a request from the cache.

If a cache receives a $Cache_w$ message for a clean Base cell, it updates the cache cell with the new data and upgrades the cache cell to WP (rule MC2). This can happen because the memory maintains no information about Base cells. It can be shown that Rule MC2 can be derived from Rules VC1 and MC6 described below.

If a cache receives a $Cache_w$ message for a Dirty Base cell, it upgrades the cache cell to WP (rule MC3).

If a cache receives a Cache$_w$ message for an address cached in the WbPending state, it discards the message (rule MC4). This can happen when the cache writes the modified data of the Base cell back to the memory before it receives the Cache$_w$ message.

If a cache receives a Cache$_w$ message for an uncached address, or an address cached in the CachePending state, it caches the data in the Clean state of WP (rules MC5 and MC6).

If a cache receives an Up$_{wm}$ message for a Base cell, it discards the message (rules MC7 and MC8). This can happen because the cache can voluntarily downgrade a WP cell while the shared memory intends to upgrade the cache cell.

If a cache receives an Up$_{wm}$ message for a WP cell, it upgrades the cache cell to Migratory (rules MC9 and MC10).

If a cache receives an Up$_{wm}$ message for an uncached address, or an address cached in the WbPending or CachePending state, it discards the message (rules MC11, MC12, and MC13). This can happen if the cache has downgraded the cell from WP to Base before it receives the upgrade message, and the Base cell has been purged from the cache or written back to the memory.

When the cache controller receives a WP-to-Base downgrade request (DownReq$_{wb}$), if the address is cached under WP in either the Dirty$_w$ or Clean$_w$ states, the cache downgrades the cell to Base, and sends a Down$_{wb}$ message to the shared memory (rules MC18, MC19). However, if the address is cached under Base, or cached in the WbPending or CachePending transient state, or is Invalid, the cache simply discards the request (rules MC16, MC17, MC20, MC21, MC22). This is because the cache has already downgraded the cell before the downgrade request is received.

When a cache receives a Migratory-to-WP downgrade request, if the address is cached under Migratory, the cache downgrades the cell to WP, and sends a Down$_{mw}$ or DownV$_{mw}$ message to the memory (rules MC27, MC28). However, if the address is cached under Base or WP, or cached in the WbPending or CachePending state, or Invalid, the cache simply discards the request (rules MC23, MC24, MC25, MC26, MC29, MC30, MC31). This is because the cache has already downgraded the cell before the downgrade request is received.

Referring to FIGS. 12D–E, the shared memory controller processes an incoming CacheReq message from cache id as follows:

If the memory state is C$_w$[dir] (id∉dir), the memory sends a Cache$_b$ message to supply a Base copy to the cache (rule MM1). An alternative treatment is that the memory sends a Cache$_w$ message to supply a WP copy (rule VM1) and discards the cache request (rule MM3).

If the memory state is C$_m$[id$_1$] (id≠id$_1$), the memory sends a DownReq$_{mw}$ message to downgrade the Migratory cell at cache id$_1$ (rule MM5). The cache request remains stalled until the downgrade request is acknowledged.

If the memory state shows that the address is already cached in the cache, the memory discards the cache request (rules MM3, MM4, MM8, MM9, MM10).

This can happen because the memory can voluntarily supply a cache copy to a cache.

If the memory state is transient and shows that address is not cached in the cache, the message is stalled for later processing (rules MM2, MM6 and MM7). The stalled message cannot be processed before the memory state becomes stable.

Referring to FIG. 12E, the shared memory controller processes an incoming Wb$_b$ message from cache site id as follows:

If the memory state is C$_w$[dir] or T$_w$[dir,sm] (id∉dir), the memory suspends the writeback message (rules MM11, MM12). For the C$_w$[dir] state, the memory multicasts a DownReq$_{wb}$ message to cache sites dir to downgrade the cache cells from WP to Base.

If the memory state is C$_w$[id|dir] or T$_w$[id|dir,sm], the memory suspends the writeback message and removes the cache identifer from the directory (rules MM13, MM14). For the C$_w$[id|dir] state, the shared memory multicasts a DownReq$_{wb}$ message to cache sites dir.

If the memory state is C$_m$[id$_1$], T$_m$[id$_1$] or Tm[id$_1$,sm] (id≠id$_1$), the memory suspends the writeback message (rule MM15, MM16 and MM17). For the C$_m$[id$_1$]) state, the memory sends a DownReq$_{mw}$ message followed by a DownReq$_{wb}$ message to cache site id1; for the T'$_m$[id$_1$] state, the memory sends a DownReq$_{wb}$ message to cache site id$_1$.

If the memory state is C$_m$[id], T'$_m$[id] or T$_m$[id,sm], the memory suspends the writeback message and updates the memory state to indicate that the address is uncached in any cache site (rules MM18, MM19 and MM20). This can happen because the memory can voluntarily send a Cache$_w$ message followed by an Up$_{wm}$ message to a cache before it receives the writeback message.

The shared-memory controller processes an incoming Down$_{wb}$, Down$_{mw}$ or DownV$_{mw}$ message as follows:

When the memory receives a Down$_{wb}$ message, if the memory state shows that the cache contains a WP copy for the address, the memory removes the cache identifier from the corresponding directory (rules MM21 and MM22). If the memory state shows that the cache contains a Migratory copy for the address, the memory updates the memory state to indicate that the address is no longer cached in any cache (rules MM23, MM24 and MM25). This can happen because the memory can voluntarily send an upgrade message to upgrade a cache cell from WP to Migratory, while the cache has downgraded the cache cell from WP to Base. The downgrade operation has higher priority than the upgrade operation.

When the memory receives a Down$_{mw}$ message, it sets the memory state to indicate that the cache contains a WP copy for the address (rules MM26, MM27 and MM28).

When the memory receives a DownV$_{mw}$ message, it updates the memory value and sets the memory state to indicate that the cache contains a WP copy for the address (rules MM29, MM30 and MM31). Rules which complete a writeback request in the Writer-Push protocol include the following:

When the memory state shows that an address is not resident in any cache, the memory can resume suspended writeback messages. For each writeback message, the memory updates the memory cell and acknowledges the cache via a WbAck$_b$ message (rule MM32).

The last resumed message can be acknowledged with a WbAck$_w$ message so that the cache can retain a WP copy (rule MM33).

Finally there are five voluntary rules that allow the memory to supply a cache copy to a cache, to upgrade a cache cell or to downgrade a cache cell:

If the memory state is $C_w[dir]$, the memory can send a Cache$_w$ message to supply a WP copy to cache site id, where id∉dir (rule VM1).

If the memory state is $C_w[id]$, the memory can send an Up$_{wm}$ message to cache site id to upgrade the cache cell from WP to Migratory (rule VM2).

If the memory state is $C_m[dir]$, the memory can multicast a DownReq$_{wb}$ message to cache sites dir to downgrade the cache cells from WP to Base (rule VM3).

If the memory state is $C_m[id]$, the memory can send a DownReq$_{wb}$ message to cache site id to downgrade the cache cell from Migratory to WP (rule VM4).

If the memory state is $T'_m[id]$, the memory can send a DownReq$_{wb}$ message to cache site id to downgrade the cache cell from WP to Base (rule VM5).

4.5 Adaptation

Each of the cache controllers as well as the shared-memory controller operates according to mandatory rules and voluntary rules. As discussed above, mandatory rules must be applied with appropriate fairness while voluntary rules can be applied at the discretion of the corresponding controller.

As an example of how the adaptivity can be exploited, consider a DSM system with limited directory space. When the shared-memory controller receives a cache request, it can respond under Base or WP. One reasonable strategy is to always supply a WP copy except when the directory is full, in which case it supplies a Base copy. Meanwhile, the memory can apply a heuristic procedure to choose a cache to which it will send a downgrade request message. The intention of the procedure is to suggest that some cache cell be downgraded from WP to Base so that the reclaimed directory space can be used for other WP copies. As a variant of this type of approach to dealing with a limited-capacity directory, the shared-memory controller can send a "heuristic" request to downgrade a cell from the WP protocol, but this request is just a hint to the cache; the cache may or may not satisfy the request. When the cache receives the heuristic request message, it can invoke the appropriate voluntary rule to downgrade the cache cell, or ignore the heuristic message if it intends to retain the WP cell for later reference. This simple adaptivity will allow an address to be resident in more caches than the number of cache identifier slots in the directory. Another example of adaptivity is for the shared-memory controller to upgrade a cell to a Migratory protocol if a cell appears to be used exclusively by a single processor.

The integrated protocol enables a wide range of adaptivity for programs with various access patterns. For example, access patterns can be detected through compiler analysis or runtime statistic collection. The integrated protocol defines a framework in which various heuristic policies are implemented by selecting appropriate voluntary rules to apply while the correctness of the protocol is always guaranteed. Customized protocols can be built dynamically with guaranteed soundness and liveness. The programmer can also provide expected access patterns as program annotations. The voluntary rules of the protocol represent a set of coherence primitives that can be safely invoked by programmers whenever necessary. Programmers can therefore build application specific protocols by selecting appropriate coherence primitives. The primitive selection is just a performance issue, and the correctness of the system can never be compromised, regardless of when and how the primitives are executed.

5 Protocol Extensions

Introducing composite messages can extend the integrated protocol. In general, the each messages in the rules described for the Integrated protocol is used to perform an operation that cannot be achieved by other messages. A composite message is equivalent to piggybacked basic messages in that its behavior can be emulated by a sequence of basic messages. Combining selected rules and defining new messages that are equivalent to the sequence of messages specified in the combined rules can extend the protocol, for instance, to improve the efficiency of an implementation of the protocol.

The integrated protocol can be extended in many aspects to incorporate more adaptivity. For example, in the integrated protocol as described above, an instruction is always stalled when the cache cell is in a transient state. This constraint can be relaxed under certain circumstances: a LoadL instruction can complete if the cache state is WbPending, and a Commit instruction can complete if the cache state is CachePending.

The integrated protocol as described above uses a general cache request that draws no distinction between different micro-protocols. Although a cache can indicate what copy it prefers as heuristic information, the memory decides what copy to supply to the cache. We can extend the protocol so that in addition to the general cache request, a cache can also send a specific cache request for a specific type of cache copy. This can be useful when caches have more knowledge than the memory about the access patterns of the program. Another advantage of having distinct cache requests is that a cache can send a request for a WP or Migratory copy while the address is cached in some Base state. In this case, the cache request behaves as an upgrade request from Base to WP or Migratory.

It is worth noting that the integrated protocol described above does not enable a cache to request an upgrade operation from WP to Migratory; instead the cache first downgrades the cell from WP to Base and then sends a cache request to the memory (although the downgrade message can be piggybacked with the cache request). We can introduce an upgrade request message so that a cache can upgrade a WP cell to a Migratory cell without first performing the downgrade operation (so that the memory does not need to send the data copy to the cache).

In the integrated protocol, a cache only receives a data copy from the memory, even though the most up-to-date data may reside in another cache at the time. Therefore, a Migratory copy is written back to the memory first before the data is supplied to another cache. A forwarding technique can be used to allow a cache to retrieve a data copy directly from another cache. This can reduce the latency to service cache misses for programs that exhibit access patterns such as the producer-consumer pattern.

The protocol is designed for non-uniform memory access (NUMA) systems in which a cache controller that determines if an access is to the local memory or some remote memory, based on the physical address of the memory access. The protocol can be extended with cache-only memory architecture (COMA)-like coherence operations to provide more adaptivity. This would allow a cache to switch between NUMA and COMA styles for the same memory region dynamically.

6 Design Methodology

Without a specification of a policy that determines when to apply voluntary rules, the combination of mandatory and voluntary rules can be viewed as defining a class of coherence protocols, or as defining an "adaptable" coherence protocol that is adapted by using a particular policy for applying the voluntary rules. As a first step in a design methodology, the correctness of the class of protocols, that is, of any application of the mandatory rules and selective application of the voluntary is verified. This verification step includes proving properties that relate to the semantics of the instructions that the memory system implements. This step of proving properties can be performed entirely manually, or with the aid of an automated theorem proving system. In one approach to verification, a reference state machine, which is known to correctly implement the semantics of the memory instructions, is shown to simulate the (non-deterministic) state machine that is defined by the mandatory and voluntary rules. That is, any state sequence for the new protocol is shown to correspond to some allowable state sequence of the reference state machine, and any state transition in the new protocol corresponds to a legal state transition in the reference state machine.

The next step of the methodology involves determining when the voluntary rules are to be applied, that is, a policy for applying the voluntary rules. Each voluntary rule includes a precondition that must be satisfied for application of the rule. The policy further restricts when to apply the rule, for example, by specifying a further precondition that must be satisfied before the action associated with that rule is taken. The policy can include procedures or rules which characterize an adaptive behavior of the protocol. For example, the policy can include monitoring of memory behavior and selecting different operating modes, such as different micro-protocols, for different addresses according to the monitored memory behavior.

The mandatory rules and the combination of the policy and the voluntary rules define a particular instance of the coherence protocol. In such an instance actions associated with mandatory and voluntary rules are applied deterministically. Since any selective application of the voluntary rules was verified to be a correct in a prior step, this particular instance of the protocol is known to be correct without necessarily considering the details of the policy for applying the voluntary rules.

A final step involves implementation of the memory system according to the rules of the particular instance of the protocol. Various alternative methods of implementation can be used. In some embodiments, the memory system includes processors programmed to operated according to the rules. Stored procedures according to which the processors operate may in some embodiments include explicit representations of the rules, while in other embodiments they may reflect the rules in their procedural specification. In other embodiments, the memory system is implemented in hardware, that is, using logic circuitry, for instance, using custom or programmable integrated circuits. In some of these embodiments, design of that logic circuitry includes an automated or semi-automated procedure in which a circuit specification is derived directly from the specification of the rules of the protocol. For instance, a hardware synthesis approach described in co-pending U. S. patent application No. 09/377,372, "Digital Circuit Synthesis System," can be used to derive a hardware specification for the memory system directly from the state transition rules for the memory system. In other embodiments, a combination of logic circuitry and programmable processors is used. Furthermore, the protocols are described in terms of FIFO communication channels between the instruction processors and the caches and between the caches and the shared memory. These FIFO channels can be implemented by parallel or serial communication busses within an integrated circuit contained on a computer backplane or a message-passing network. The protocols described above can also be applied to distributed shared-memory systems in which caches and shared memory are on different computers coupled by a data network. This data network could be local, or could be a wide area network, such as the Internet. Note that implementation of the memory system, in general, includes implementation of multiple distributed components (individual caches and the shared memory) of the memory system which together provide a correct implementation in their combined behavior.

7 Other Embodiments

The description above concentrates on design of a coherent distributed shared-memory system that provides a correct implementation of a particular set memory instructions with well-defined semantics of the CRF model. In other embodiments, other memory instructions and memory models are supported. For instance, in some alternative embodiments, memory instructions are translated into CRF model instructions. The translation can be performed statically by the compiler or dynamically by the protocol engines. This implies that different memory models can be applied in different memory regions or by different instruction processors simultaneously. In a program that assumes release consistency, for example, the memory region used for input and output operations can have the semantics of sequential consistency by employing an appropriate translation scheme for that region.

The design methodology, which includes the steps of specifying a set of mandatory rules and a set of voluntary rules and then verifying that any selective application of the voluntary rules yields a correct implementation, is not limited to design of coherent distributed shared-memory systems. A shared-memory system can be viewed as a system that provides a interfaces to a number of clients and processes instructions from those clients according to a protocol in which messages have well-defined semantics. For example, a distributed network-based system that provides services to a number of clients can be designed using a similar methodology. When the network-based system provides a shared-memory service, such as a distributed name service, the rules of the protocol described above for the CRF model may be used directly, possibly with appropriate translation of requests from clients into requests that match the semantics of the CRF model.

It is to be understood that the foregoing description is intended to illustrate and not to limit the scope of the invention, which is defined by the scope of the appended claims. Other embodiments are within the scope of the following claims.

What is claimed is:

1. In a coherent shared-memory system that includes a plurality of caches and a shared memory coupled to each of the caches, wherein the shared memory includes a directory for associating each of a plurality of addresses in a shared address range with caches that each has a value associated with said address in a storage at that cache, a method comprising:

at each of the plurality of caches, storing a value associated with a first address in the shared address range in the storage of said cache;

while storing the values associated with the first address at each of the caches, associating in the directory the first address with some but not all of the caches which are storing said values; and while associating the first address with some but not all of the caches which are storing values associated with said first address, providing a coherent memory model for said first address to processors coupled to each of the plurality of caches.

2. A coherent shared-memory system comprising:

a plurality of caches, each including an interface to the shared-memory system for a different one of a plurality of processors and a storage for values associated with addresses in a shared address range shared by the processors; and a shared memory coupled to each of the plurality of caches, including a directory for associating each of a plurality of addresses in the shared address range with caches that each has a value associated with said address in its storage;

wherein the directory is configured to in operation associate a first address in the shared address range with some but not all of the caches that have values in their storages associated with said first address while the shared-memory system provides a coherent memory model for said first address to each of the plurality of processor.

3. In a coherent shared-memory system that includes a plurality of caches each coupled to a different one of a plurality of processors and a shared memory coupled to each of the caches, a method comprising:

providing at a first cache a first storage associated with a first address in an address range shared by the processors;

associating the first storage with one of a plurality of operating modes;

storing a value in the first storage;

receiving from a first processor coupled to the first cache a first memory instruction related to the first address; and processing the first memory instruction according to the operating mode associated with the first address, including if the first storage is associated with a first of the operating modes, causing a value associated with the first address to be transferred between the shared memory and the first cache, and if the first storage is associated with a second of the operating modes processing the memory instruction without causing a value associated with the first address to be transferred between the shared memory and the first cache.

4. The method of claim 3 further comprising:

providing at a second cache a second storage associated with the first address; and associating the second storage with a different one of the operating modes than the operating mode with which the first storage is associated.

5. The method of claim 3 wherein receiving the first memory instruction includes receiving an instruction to make a value associated with the first address at the first cache accessible to processors other than the first processor, and causing a value associated with the first address to be transferred between the shared memory and the first cache includes transferring the value from the first cache to the shared memory.

6. The method of claim 5 wherein the first memory instruction include a commit instruction.

7. The method of claim 3 wherein receiving the first memory instruction includes receiving an instruction that cause a value stored by another of the processors at the first address to be retrieved by the first processor, and causing a value associated with the first address to be transferred between the shared memory and the first cache includes causing the value to be transferred to the first cache from the shared memory.

8. The method of claim 7 wherein the first memory instruction includes a reconcile instruction.

* * * * *